(12) United States Patent
Tanishima

(10) Patent No.: US 6,791,918 B1
(45) Date of Patent: Sep. 14, 2004

(54) ENCODING AND DECODING APPARATUS FOR RECORDING WRITE DATA

(75) Inventor: Hideaki Tanishima, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 291 days.

(21) Appl. No.: 09/717,131

(22) Filed: Nov. 22, 2000

(30) Foreign Application Priority Data

May 31, 2000 (JP) ....................................... 2000-161700

(51) Int. Cl.⁷ ............................................. G11B 7/00
(52) U.S. Cl. ................................. 369/47.1; 369/47.27
(58) Field of Search ............................. 369/47.1, 47.25, 369/47.28, 47.3, 47.27, 47.32, 47.34, 47.39

(56) References Cited

U.S. PATENT DOCUMENTS

| | | | | |
|---|---|---|---|---|
| 5,877,907 A | * | 3/1999 | Tanishima et al. | 369/48 |
| 6,028,828 A | * | 2/2000 | Maeda | 369/50 |
| 6,181,655 B1 | * | 1/2001 | Gushima | 369/50 |
| 6,195,325 B1 | * | 2/2001 | Okanishi | 369/124.08 |
| 6,256,282 B1 | * | 7/2001 | Yamagami et al. | 369/111 |

FOREIGN PATENT DOCUMENTS

JP          8-212691          8/1996

* cited by examiner

*Primary Examiner*—Nabil Hindi
(74) *Attorney, Agent, or Firm*—Staas & Halsey LLP

(57) ABSTRACT

A data recording apparatus that accurately records constant linear velocity (CLV) or zone constant linear velocity (ZCLV) data on a recording medium while rotating the recording medium based on the CAV method. A data recording apparatus supplies data recorded on a recording medium, which is rotated by a motor, to a pickup device. The pickup device generates position information indicating the position of the pickup device with respect to the recording medium. The apparatus includes a recording control circuit that controls the motor such that the recording medium is rotated in a manner compliant with a constant angular velocity (CAV) method and controls an output rate of the data supplied to the pickup device based on the position information such that the data is recorded on the recording medium in a manner compliant with a CLV or a ZCLV method.

26 Claims, 16 Drawing Sheets

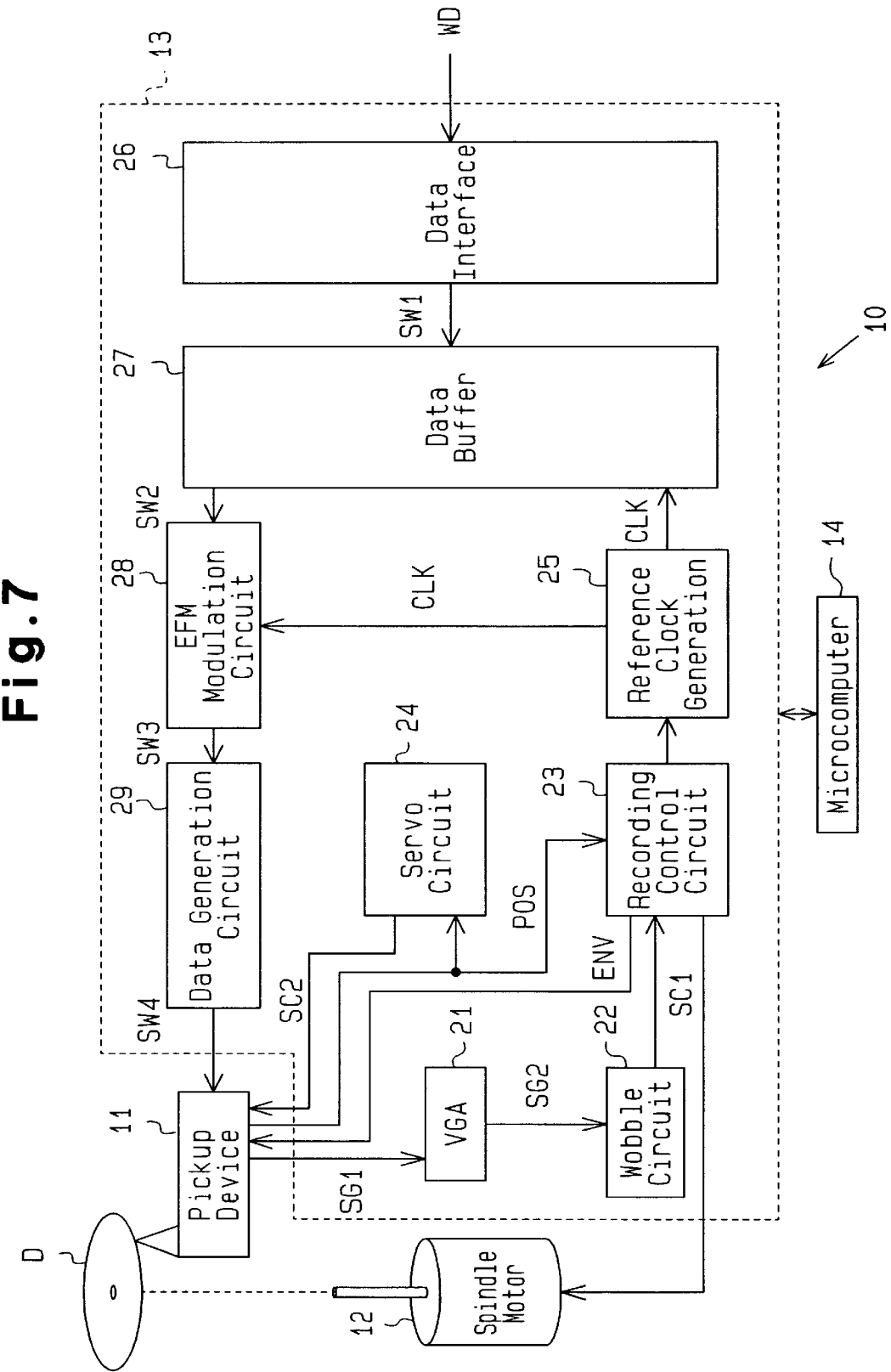

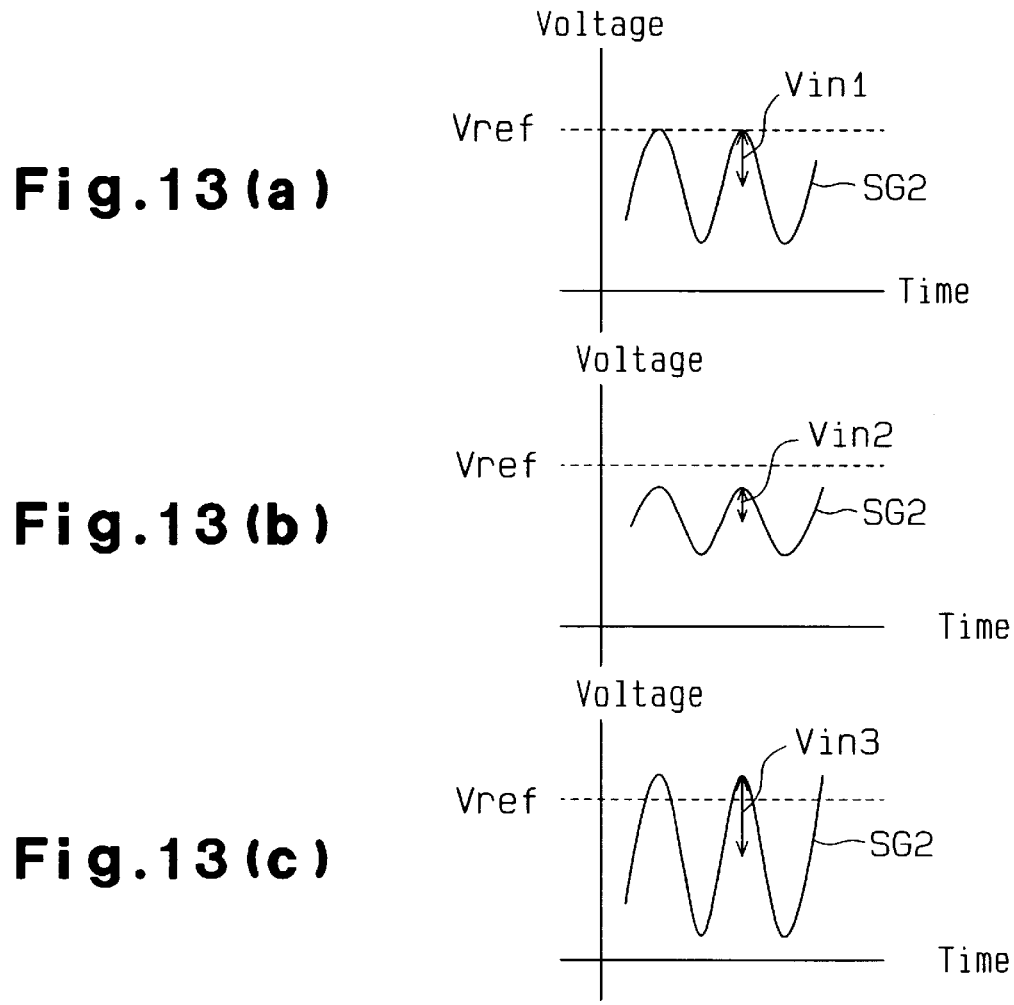
Fig.13(a)
Fig.13(b)
Fig.13(c)
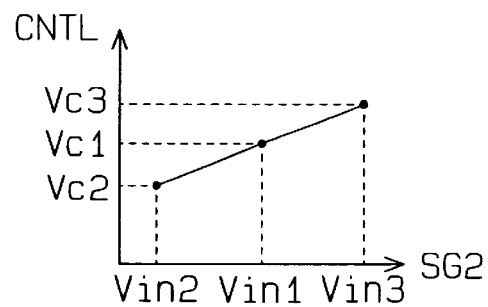
Fig.14

ENCODING AND DECODING APPARATUS FOR RECORDING WRITE DATA

BACKGROUND OF THE INVENTION

The present invention relates to a data recording apparatus, and more particularly to a data recording apparatus for recording data on a recording medium, such as a CD-R, a CD-RW, a DVD-R, or a DVD-RW.

Optical disk recording media, such as an LD (Laser Disk), a CD-ROM (Compact Disk Read Only Memory), an MD (Minidisk), and a PD (Phase-change Disk), are essential media for recording multimedia information. A DVD (Digital Versatile Disk), which has a storage capacity approximately 7.5 times as large as that of the CD-ROM, is also used for the same purpose. With such an increase in storage capacity of the recording media, a higher recording speed is required of a data recording apparatus. Further, as portable personal computers become more popular, there is an increasing demand for a data recording apparatus that is even more compact in size and consumes less electric power.

Methods of recording data on an optical disk employed by the data recording apparatus include the Constant Linear Velocity (CLV) method, the Zone Constant Linear Velocity (ZCLV) method, and the Constant Angular Velocity (CAV) method.

The CLV method employs a data recording format shown in FIG. 1. More specifically, in this method, units of data are recorded in respective sectors of each track T of a disk. Each sector has an address area A1 and a data area A2, and each sector has a fixed length irrespective of the radial position of the sector on the disk.

In the CLV method, the data recording apparatus controls the rotational speed of the disk such that each track T on the disk corresponding in position to a pickup device of the system is rotated at a constant linear speed, as shown in FIG. 2(a). The data recording apparatus holds the data rate (i.e. the frequency of recording data) at a constant level regardless of a position on the disk, as shown in FIG. 2(b). The term "data rate" refers to the amount of data recorded on a disk per unit time. Through the control described above, the length of each sector is constant irrespective of the radial position of the sector on the disk, as shown in FIG. 2(c).

The ZCLV method employs a data recording format shown in FIG. 3. More specifically, a plurality of zones Z are arranged radially, and sectors of tracks T in an outer zone Z are longer than sectors of tracks T in an inner zone Z. Within each zone Z, the length of each sector varies at a predetermined rate from one track to another. To this end, the sectors of all the tracks T in the zone are radially aligned and arranged in a radial pattern.

In the ZCLV method, the data recording apparatus performs zone-by-zone stepwise adjustment of the rotational speed of the disk based on the position of the pickup device, such that the plurality of tracks T within an identical zone Z are rotated at a constant linear speed as shown in FIG. 4(a). The data recording apparatus holds the data rate at a constant level regardless of the radial position of the pickup device, as shown in FIG. 4(b). According to the ZCLV method, the recording pit length varies at a predetermined rate within each zone Z as shown in FIG. 4(c), and hence the sector length also varies at a predetermined rate within each zone.

The CAV method employs a data recording format as shown in FIG. 5. More specifically, the sectors of all the tracks T on the disk are radially aligned and arranged in a radial pattern such that the length of each sector increases toward the outer periphery of the disk.

In this method, as shown in FIG. 6(a), the rotational speed of the disk is constant. Further, as shown in FIG. 6(b), the data recording apparatus holds the data rate at a constant level regardless of the radial position of the pickup device. According to the CAV method, as shown in FIG. 6(c), the recording pit length increases toward the outer periphery of the disk, and the sector length is also increased toward the outer periphery of the disk.

The CLV method has the highest recording density of the three. Therefore, assuming that disks having an identical size are used for recording by the respective methods, a CLV disk has the largest storage capacity. The ZCLV method is advantageous in that it provides a large storage capacity, like the CLV method, and in that the rotational speed of the disk-driving motor can be relatively easily controlled. The recording density of the ZCLV disk is between that of the CLV disk and that of the CAV disk. The recording density of the CAV disk is the lowest of the three.

In CD-R, DVD-R and similar disks, data is recorded by the CLV method or the ZCLV method for higher recording densities.

In a data recording apparatus using the CLV method or the ZCLV method, to increase the recording speed, it is required to increase the rotational speed of the disk. However, in the CLV method, it is required to quickly vary the rotational speed of the disk to seek a sector radially remote from a certain (present) position on the disk. Therefore, the driving torque of the disk-driving motor must be sufficient, which results in not only an increase in size of the motor but also an increase in electric power consumption.

In a data recording apparatus using the CAV method, since the disk is rotated at a constant speed, it is easy to increase the recording speed. Further, the data recording apparatus uses a motor having a small driving torque. Therefore, one might think that if a disk formatted by the CLV method or the ZCLV method is rotated at a constant speed for recording by the CAV method, it would be possible to improve the writing speed and reduce the size of the motor and the electric power consumption.

However, even if data recording is performed by the CLV method or the ZCLV method on a disk being rotated at a constant speed, CAV data is recorded on the disk, which makes it impossible for the other disk apparatus to properly read the data. That is, it is impossible to record CLV or ZCLV data on a disk that is controlled according to the conventional CAV method.

SUMMARY OF THE INVENTION

It is an object of the invention to provide a data recording apparatus that accurately records CLV or ZCLV data on a recording medium while rotating the recording medium based on the CAV method.

In a first aspect of the present invention, a data recording apparatus is provided that supplies data recorded on a recording medium, which is rotated by a motor, to a pickup device. The pickup device generates position information indicating the position of the pickup device with respect to the recording medium. The apparatus includes a recording control circuit that controls the motor such that the recording medium is rotated in a manner compliant with a constant angular velocity (CAV) method and controls an output rate of the data supplied to the pickup device based on the position information such that the data is recorded on the recording medium in a manner compliant with a constant linear velocity (CLV) method.

In a second aspect of the present invention, a data recording apparatus is provided that supplies data recorded on a recording medium, which is rotated by a motor, to a pickup device. The pickup device generates position information indicating the position of the pickup device with respect to the recording medium. The apparatus includes a recording control circuit that controls the motor such that the recording medium is rotated in a manner compliant with a constant angular velocity (CAV) method and controls an output rate of the data supplied to the pickup device based on the position information such that the data is recorded on the recording medium in a manner compliant with one of a constant linear velocity (CLV) method and a zone constant linear velocity (ZCLV) method.

In a third aspect of the present invention, a data recording apparatus is provided that supplies data recorded on a recording medium, which is rotated by a motor, to a pickup device. The pickup device generates position information indicating the position of the pickup device with respect to the recording medium and reads a wobble signal having a predetermined frequency from the recording medium. The apparatus includes a variable gain amplifier that receives the wobble signal from the pickup device and generates an amplified wobble signal having a constant amplitude. A recording control circuit controls the motor such that the recording medium is rotated in a manner compliant with a constant angular velocity (CAV) method and controls an output rate of the data supplied to the pickup device based on the position information and the predetermined frequency of the amplified wobble signal such that the data is recorded on the recording medium in a manner compliant with one of a constant linear velocity (CLV) method and a zone constant linear velocity (ZCLV) method.

In a fourth aspect of the present invention, a disk apparatus is provided that includes a motor for rotating a recording medium and a pickup device for recording data on the recording medium. The pickup device generates position information indicating the position of the pickup device with respect to the recording medium. A data recording device is connected to the motor and the pickup device, controls the motor such that the recording medium is rotated in a manner compliant with a constant angular velocity (CAV) method, and controls an output rate of the data supplied to the pickup device based on the position information such that the data is recorded on the recording medium in a manner compliant with a constant linear velocity (CLV) method.

In a fifth aspect of the present invention, a disk apparatus is provided that includes a motor for rotating a recording medium and a pickup device for recording data on the recording medium. The pickup device generates position information indicating the position of the pickup device with respect to the recording medium. A data recording device is connected to the motor and the pickup device, controls the motor such that the recording medium is rotated in a manner compliant with a constant angular velocity (CAV) method, and controls an output rate of the data supplied to the pickup device based on the position information such that the data is recorded on the recording medium in a manner compliant with one of a constant linear velocity (CLV) method and a zone constant linear velocity (ZCLV) method.

In a sixth aspect of the present invention, a method is provided that supplies data to a pickup device and records the data on a recording medium. First, position information indicating the position of the pickup device with respect to the recording medium is generated. Then, the recording medium is rotated in a manner compliant with a constant angular velocity (CAV) method. An output rate of the data supplied to the pickup device is controlled based on the position information such that the data is recorded on the recording medium in a manner compliant with a constant linear velocity (CLV) method.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a schematic block diagram of a data recording apparatus according to one embodiment of the present invention;

FIGS. 13(a) to 13(c) show waveforms of an input voltage of the variable gain amplifier;

FIG. 14 is a graph showing the relationship between an input voltage and an output voltage of the comparator of FIG. 12;

DETAILED DESCRIPTION OF THE PREFERRED EMBODIMENT

The invention will now be described in detail with reference to drawings showing an embodiment thereof.

FIG. 7 is a schematic block diagram of an optical disk apparatus 10 according to one embodiment of the present invention.

The optical disk apparatus 10 is capable of recording data on a disk D, such as a CD-R or a DVD-R, that is adapted to the CLV method or the ZCLV method.

The optical disk apparatus 10 includes a pickup device 11 for recording data on the disk D and reading data from the disk D, a spindle motor 12 for rotating the disk D, and a data recording apparatus 13. The data recording apparatus 13 controls the spindle motor 12, receives data WD from an external system, and generates format data corresponding to the disk D from the data DW. The format data is supplied to the pickup device 11.

The pickup device 11 performs tracking control and focusing control of the device 11 itself in response to reflected light from the disk D. Further, the pickup device 11 reads a wobble signal and position information (address information superimposed on the wobble signal or address information recorded between sectors) on the disk D and supplies the position information POS and the wobble signal SG1 to the data recording apparatus 13.

The data recording apparatus 13 detects the rotational speed (number of rotations per unit time) of the disk D from the wobble signal SG1 and generates a rotation control signal SC1 for holding the rotational speed of the spindle motor 12 constant based on the detected rotational speed of the disk D. The spindle motor 12 operates in response to the rotation control signal SC1 such that the disk D is rotated at a constant angular speed.

The data recording apparatus 13 performs EFM modulation of the data WD received from the external system to generate an EFM-modulated data. The data recording apparatus 13 changes the output rate at which the EFM-modulated data is sent to the pickup device 11 based on the position information from the pickup device 11 and the rotational speed of the disk D.

Figure 1:
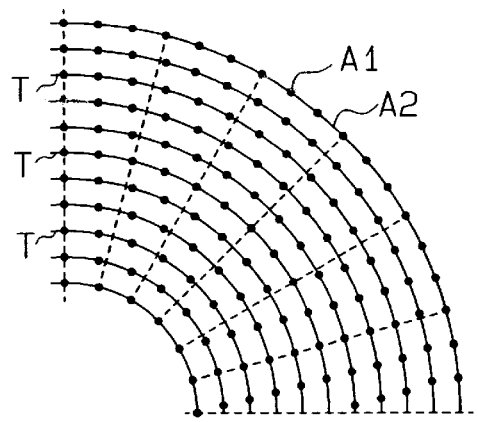
FIG. 1 is a diagram showing a conventional CLV disk format.
Figure 2A:
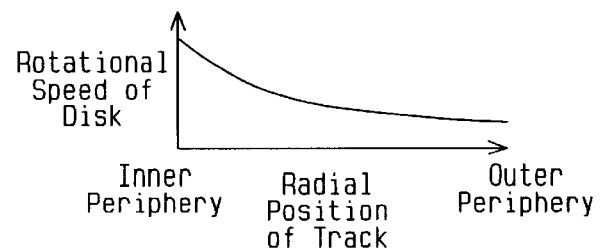
FIG. 2(a) is a graph showing the relationship between the position of a track and the rotational speed of a disk according to the CLV method.
Figure 2B:
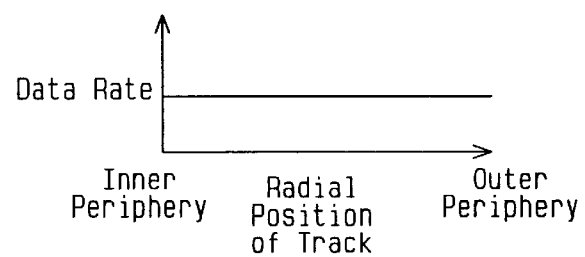
FIG. 2(b) is a graph showing the relationship between the position of a track and a data rate according to the CLV method.
Figure 2C:
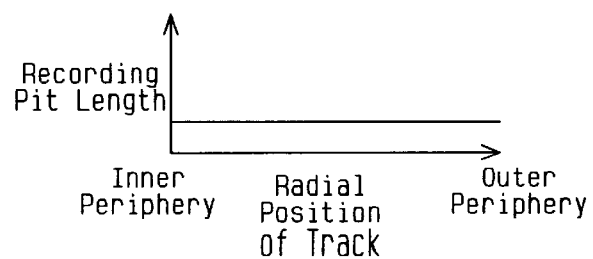
FIG. 2(c) is a graph showing the relationship between the position of a track and a recording pit length according to the CLV method.
Figure 3:
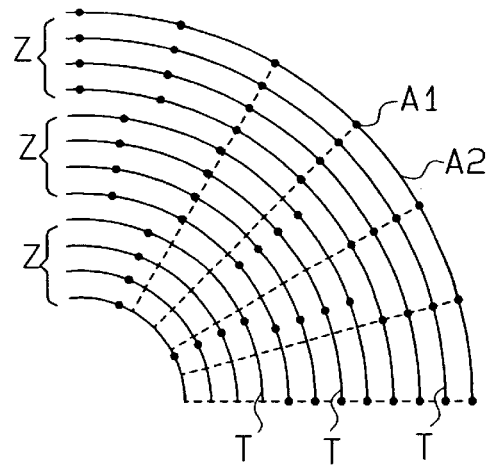
FIG. 3 is a diagram showing a conventional ZCLV disk format.
Figure 4A:
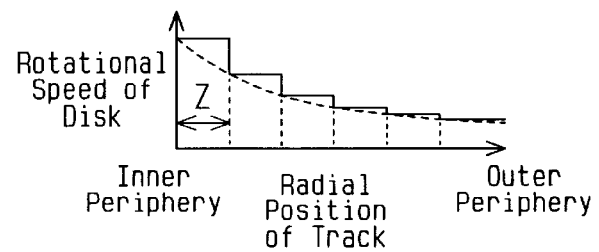
FIG. 4(a) is a graph showing the relationship between the position of a track and the rotational speed of a disk according to the ZCLV method.
Figure 4B:
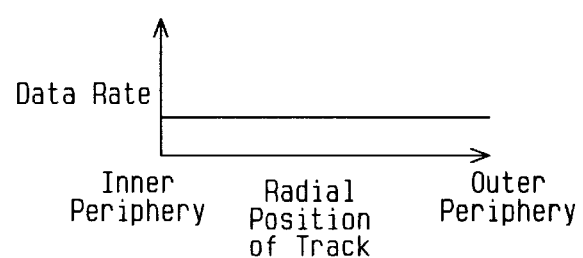
FIG. 4(b) is a graph showing the relationship between the position of a track and a data rate according to the ZCLV method.
Figure 4C:
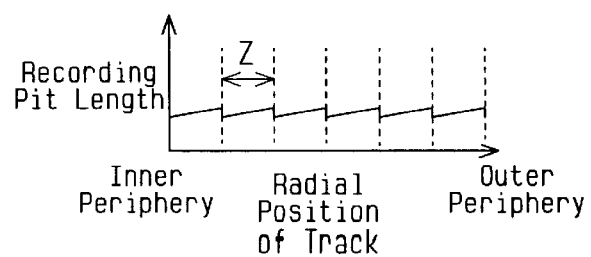
FIG. 4(c) is a graph showing the relationship between the position of a track and a recording pit length according to the ZCLV method.
Figure 5:
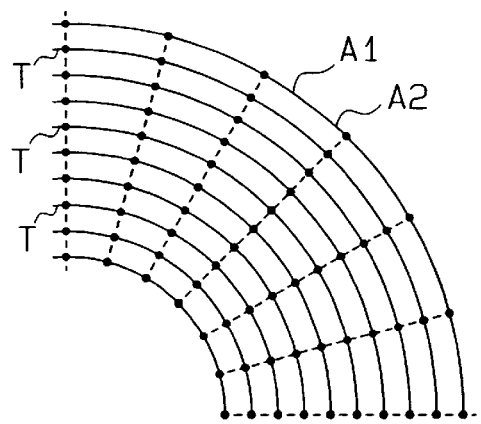
FIG. 5 is a diagram showing a conventional CAV disk format.
Figure 6A:
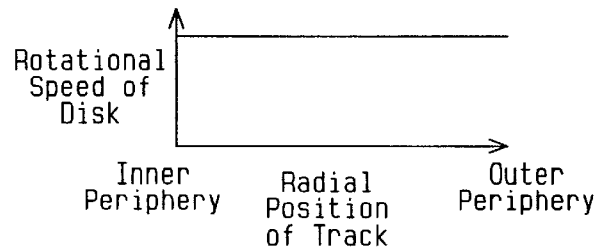
FIG. 6(a) is a graph showing the relationship between the position of a track and the rotational speed of a disk according to the CAV method.
Figure 6B:
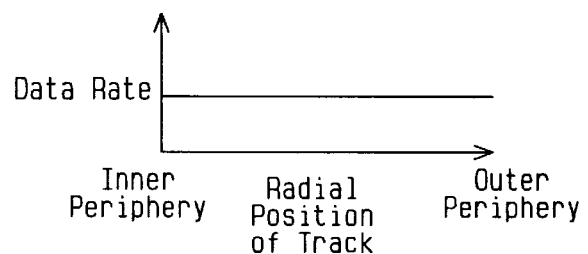
FIG. 6(b) is a graph showing the relationship between the position of a track and a data rate according to the CAV method.
Figure 6C:
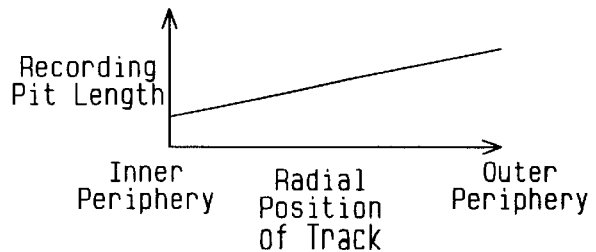
FIG. 6(c) is a graph showing the relationship between the position of a track and a recording pit length according to the CAV method.
Figure 8:
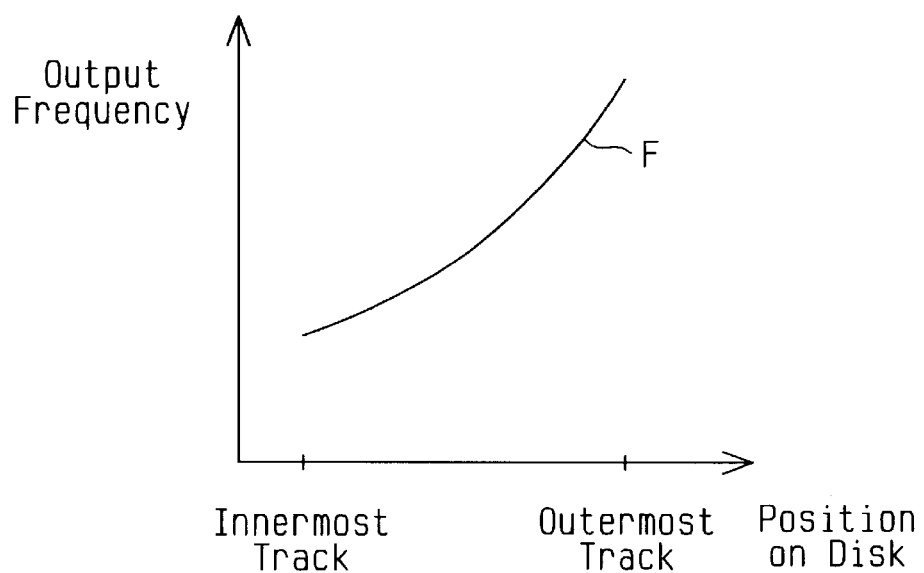
FIG. 8 is a graph showing the relationship between a position of a pickup device on a disk and an output frequency of the pickup device.

More specifically, when the disk D, which is subjected to recording by the CLV method, is rotated at a constant speed according to the CAV method, the linear speed of a sector of an inner track is different from that of a sector of an outer track. For this reason, as shown in FIG. 8, the frequency F of an analog signal supplied from the pickup device 11 to the data recording apparatus 13 is increased as the pickup device 11 moves from the innermost track of the disk D toward the outermost track of the same. The ratio between the value of the frequency F of the analog signal generated when the pickup device 11 is positioned at the innermost track of the disk D and that when the pickup device is positioned at the outer periphery is 1:2.5 at the maximum. The data recording apparatus 13 changes the output rate at which the recording data is supplied to the pickup device 11 based on the position of the pickup device 11 and the rotational speed of the disk D detected from the wobble signal SG1. By changing the output rate as described above, data having a frequency according to the position of the pickup device 11 is recorded on the disk D, so that the format of the recorded data agrees with that of CLV data recorded by the CLV method.

The data recording apparatus 13 includes a variable gain amplifier (VGA) 21, a wobble circuit 22, a recording control circuit 23, a servo circuit 24, a reference clock generator circuit 25, a data interface 26, a data buffer 27, an EFM modulation circuit 28, and a data generation circuit 29.

Figure 9:
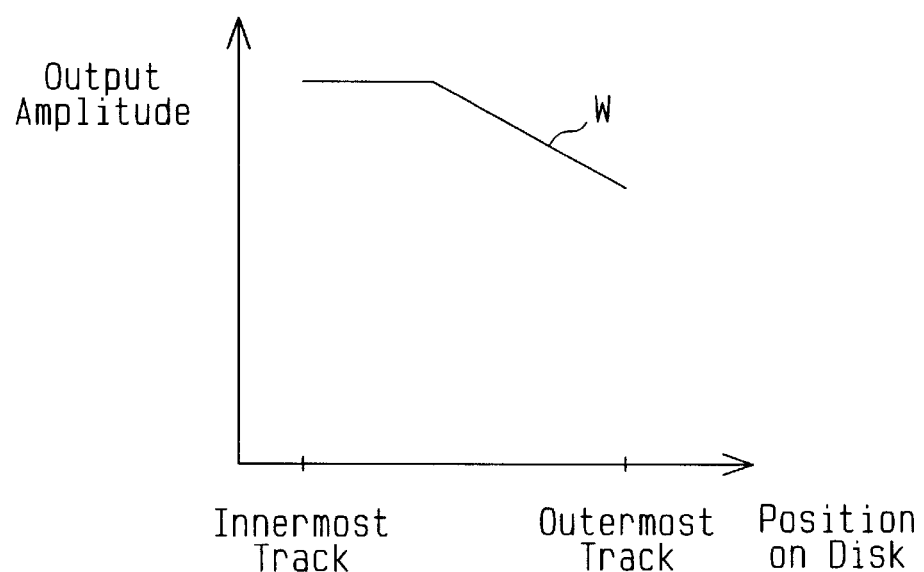
FIG. 9 is a graph showing the relationship between the position of the pickup device on the disk and an output amplitude of the pickup device.

The VGA 21 receives the wobble signal SG1 from the pickup device 11 and then amplifies the wobble signal SG1 to generate an amplified wobble signal SG2 having a constant amplitude. As shown in FIG. 9, the amplitude W of the wobble signal SG1 varies with the reading position of the pickup device 11. More specifically, the amplitude W of the wobble signal SG1 decreases as the pickup device 11 moves from the innermost track of the disk D to the outermost track. Further, the amplitude W of the wobble signal SG1 varies with the rotational speed of the disk D. More specifically, as the rotational speed of the disk D increases, the amplitude W of the wobble signal SG1 decreases.

The wobble circuit 22 receives the amplified wobble signal SG2 from the VGA 21 and detects the rotational speed of the disk D based on the amplified wobble signal SG2. Since the wobble signal SG2 has been amplified by the VGA 21 such that the amplitude is held constant, as described above, the rotational speed of the disk D can be positively detected.

The recording control circuit 23 receives information of the rotational speed detected by the wobble circuit 22, the position information (information of position of the pickup device 11) supplied from the pickup device 11, and a preset value (recording speed information indicative of how many times faster the recording should be executed than the standard speed (single speed)) supplied from a microcomputer 14. The recording control circuit 23 supplies the rotation control signal SC1 to the spindle motor 12 based on the rotational speed information and the recording speed information. Further, the circuit 23 calculates a frequency division ratio of the reference clock generator circuit 25 based on the rotational speed information the position information, and the recording speed information, and supplies a frequency division ratio-setting signal indicative of the calculated frequency division ratio to the reference clock generator circuit 25.

Further, the recording control circuit 23 receives recording control information from the microcomputer 14 and supplies a recording control signal ENV to the pickup device 11. The pickup device 11 executes and stops recording in response to the recording control signal ENV.

The servo circuit 24 supplies the position control signal SC2 to the pickup device 11 based on the position information supplied from the pickup device 11 and the recording speed information supplied from the microcomputer 14. The pickup device 11 is moved to a desired track in response to the position control signal SC2.

Preferably, the reference clock generator circuit 25 is formed by a PLL frequency synthesizer and divides an oscillation signal in response to the frequency division ratio-setting signal supplied from the recording control circuit 23 to generate a reference clock signal CLK. The reference clock signal CLK is supplied to the data buffer 27 and the EFM modulation circuit 28.

The disk D has a spiral track, and the pickup device 11 is moved on the track toward the outer edge of the disk D as the recording proceeds. The recording control circuit 23 changes the frequency division ratio of the reference clock generator circuit 25, based on the position information POS received from the pickup device 11. As a result, the reference clock generator circuit 25 generates a reference clock signal CLK having a frequency corresponding to the position of the track (i.e., the position of the pickup device 11).

The data interface 26 receives the data WD from the external system and supplies a data signal SAW to the data buffer 27. The data buffer 27 buffers the data signal SW1 supplied from the interface 26 and supplies the buffered data SW2 to the EFM modulation circuit 28 according to the reference clock signal CLK from the reference clock generator circuit 25. The output rate (frequency) of the buffered data SW2 corresponds to the frequency of the reference clock signal CLK (i.e., the frequency corresponding to the position of the pickup device 11).

The EFM modulation circuit 28 modulates the 8-bit buffered data from the data buffer 27 to 14-bit EFM data according to the reference clock signal CLK. This EFM modulation reduces the DC component of the 8-bit buffered data. Further, the EFM modulation circuit 28 adds three marginal bits to the 14-bit EFM data to generate a 17-bit EFM modulation signal SW3. The three marginal bits are used to combine 14-bit patterns with each other to reduce low frequency components of the power spectrum of the data.

The data generation circuit 29 generates a recording signal SW4 having a format corresponding to the disk D from the EFM modulation signal SW3 supplied from the EFM modulation circuit 28 and supplies the recording signal SW4 to the pickup device 11. More specifically, the data generation circuit 29 generates an internal clock signal having a phase that is substantially coincident with the phase of the EFM modulation signal SW3 and generates the recording signal SW4 in synchronism with the internal clock signal. Thus, the data generation circuit 29 supplies the recording signal SW4 to the pickup device 11 in synchronism with the input of the EFM modulation signal SW3.

Figure 10:
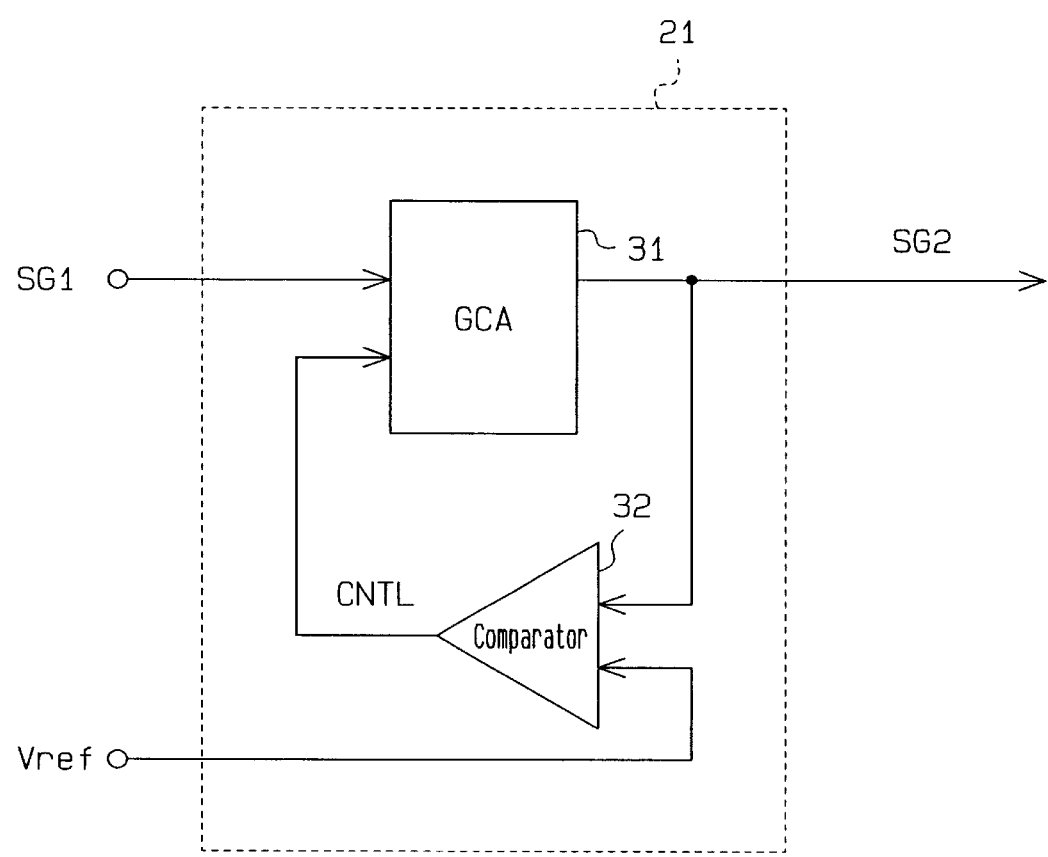
FIG. 10 is a schematic block diagram of a variable gain amplifier of the data recording apparatus of FIG. 7.

FIG. 10 schematically shows the construction of the VGA 21.

The VGA 21 includes a gain control amplifier (GCA) 31 and a comparator 32. The GCA 31 amplifies the wobble signal SG1 supplied from the pickup device 11 to generate the amplified wobble signal SG2.

The comparator 32 compares the amplified wobble signal SG2 and a reference voltage signal Vref and then supplies a control signal CNTL based on the result of the comparison to the GCA 31. The GCA 31 changes its amplification factor in response to the control signal CNTL such that the amplitude of the amplified wobble signal SG2 is constant.

Figure 11:
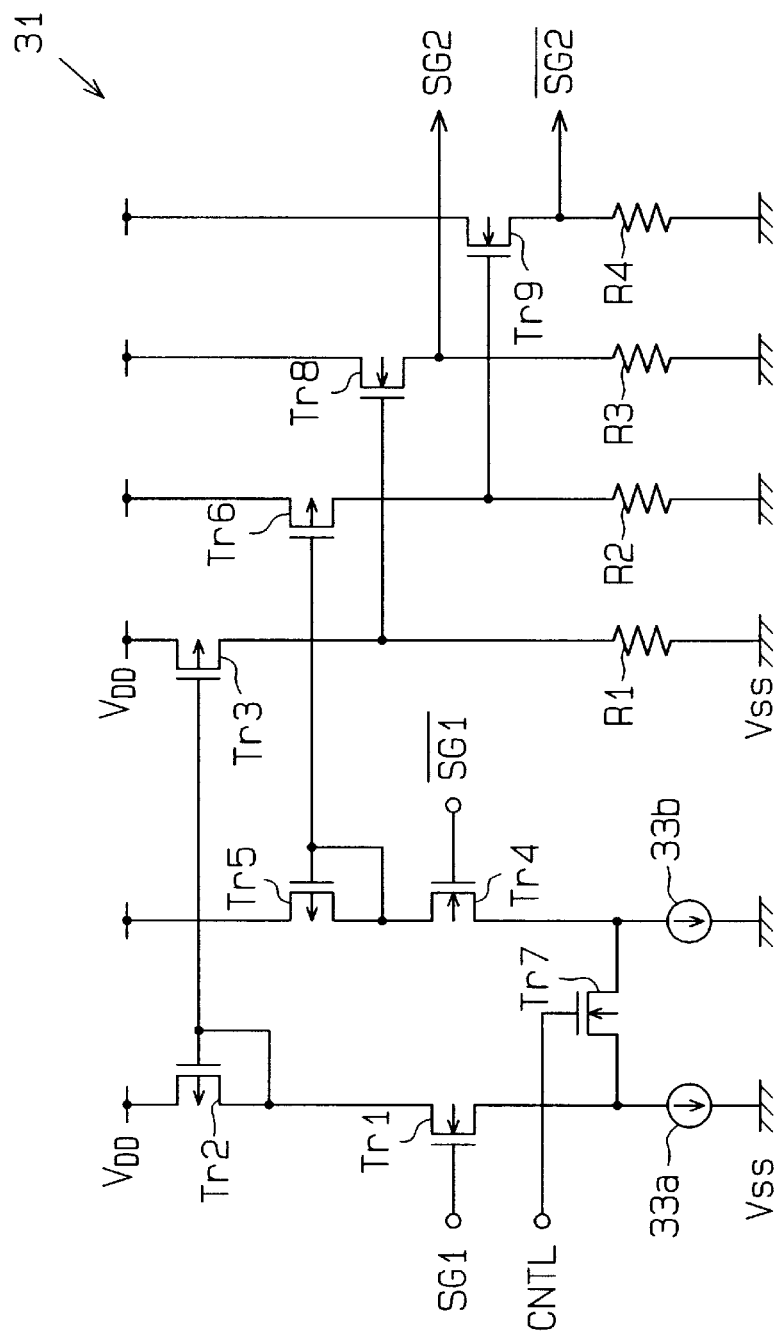
FIG. 11 is a schematic block diagram of a gain control amplifier of the variable gain amplifier of FIG. 10.

FIG. 11 schematically shows the construction of a circuit of the GCA 31.

The wobble signal SG1 is supplied to the gate of an N-channel MOS transistor Tr1. The drain of the transistor Tr1 is connected to a high potential power supply VDD via a P-channel MOS transistor Tr2. The source of the transistor Tr1 is connected to a low potential power supply Vss via a current source 33a.

The gate and the drain of the transistor Tr2 are connected together and are connected to the gate of a P-channel MOS transistor Tr3. The source of the transistor Tr3 is connected to the power supply VDD, and the drain of the transistor Tr3 is connected to the power supply Vss via a resistor R1. Therefore, the transistors Tr2, Tr3 form a current mirror circuit.

A complementary signal /SG1 of the wobble signal SG1 is supplied to the gate of an N-channel MOS transistor Tr4. The drain of the transistor Tr4 is connected to the power supply VDD via a P-channel MOS transistor Tr5, and the source of the transistor Tr4 is connected to the power supply Vss via a current source 33b.

The gate and the drain of the transistor Tr5 are connected together and are connected to the gate of a P-channel MOS transistor Tr6. The source of the transistor Tr6 is connected to the power supply VDD, and the drain of the transistor Tr6 is connected to the power supply Vss via a resistor R2. Therefore, the transistors Tr5, Tr6 form a current mirror circuit.

The sources of the transistors Tr1, Tr4 are connected to each other via an N-channel MOS transistor Tr7. The control signal CNTL is supplied to the gate of the transistor Tr7. The drain of the transistor Tr3 is connected to the gate of an N-channel MOS transistor Tr8. The drain of the transistor Tr8 is connected to the power supply VDD, and the source of the transistor Tr8 is connected to the power supply Vss via a resistor R3.

The drain of the transistor Tr6 is connected to the gate of an N-channel MOS transistor Tr9. The drain of the transistor Tr9 is connected to the power supply VDD, and the source of the transistor Tr9 is connected to the power supply Vss via a resistor R4.

The amplified wobble signal SG2 and its complementary signal /SG2 are output from the respective sources of the transistors Tr8, Tr9.

The operation of the GCA 31 is explained below. The level difference between the wobble signal SG1 and its complementary signal /SG1 causes a difference between the drain currents of the transistors Tr3, Tr6, which causes a difference between the gate potentials of the transistors Tr8, Tr9. Then, a difference is caused between the drain currents of the transistors Tr8, Tr9 according to the difference in gate potential between the transistors Tr8, Tr9, and the amplified wobble signal SG2 and its complementary signal /SG2 are output from the respective sources of the transistors Tr8, Tr9.

As the potential of the control signal CNTL rises, the drain current of the transistor Tr7 is increased. The increase in the drain current of the transistor Tr7 causes a decrease in difference between the drain currents of the transistors Tr1, Tr4, and the potential difference between the amplified wobble signal SG2 and its complementary signal /SG2 is reduced. Therefore, when the voltage of the control signal CNTL rises, the amplification factor is reduced to less than "1", while when the voltage of the control signal CNTL drops, the amplification factor is increased to more than "1".

Figure 12:
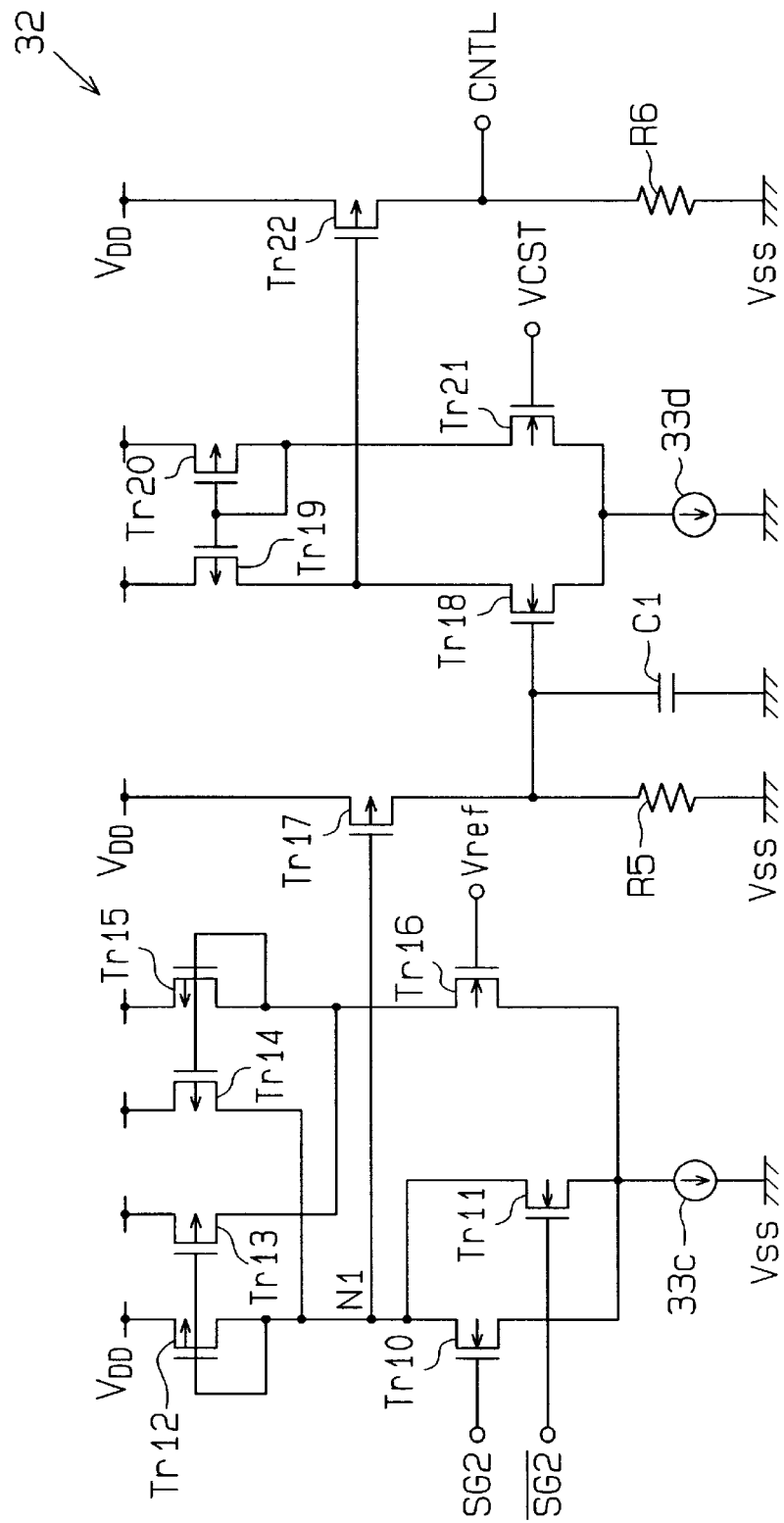
FIG. 12 is a schematic block diagram of a comparator of the variable gain amplifier of FIG. 10.

FIG. 12 schematically shows a circuit of the comparator 32.

The amplified wobble signal and its complementary signal SG2, /SG2 are supplied to the respective gates of N-channel MOS transistors Tr10, Tr11. The sources of the transistors Tr10, Tr11 are connected to the power supply Vss via a current source 33c.

On the other hand, the drains of the transistors Tr10, Tr11 are connected to drains of P-channel MOS transistors Tr12, Tr14. The sources of the transistors Tr12, Tr14 are connected to the power supply VDD, and the transistor Tr12 has its gate connected to its own drain.

The reference voltage Vref is supplied to the gate of an N-channel MOS transistor Tr16. The source of the transistor Tr16 is connected to the power supply Vss via the current source 33c.

The drain of the transistor Tr16 is connected to the drains of P-channel MOS transistors Tr13, Tr15. The sources of the transistors Tr13, Tr15 are connected to the power supply VDD, and the gate and the drain of the transistor Tr15 are connected together.

The gate of the transistor Tr13 is connected to the drain of the transistor Tr12, and the gate of the transistor Tr14 is connected to the drain of the transistor Tr15.

The transistors Tr10 to Tr16 form a differential circuit. When the peak voltages of the amplified wobble signal SG2 and its complementary signal /SG2 exceed the reference voltage Vref, the potential of the drains (node N1) of the transistors Tr10, Tr11 falls, whereas when the peak voltages of the signals SG2, /SG2 are below the reference voltage Vref, the potential of the node N1 rises.

The node N1 is connected to the gate of a P-channel MOS transistor Tr17. The source of the transistor Tr17 is connected to the power supply VDD, and the drain of the transistor Tr17 is connected to the power supply Vss via a resistor R5. A capacitor C1 is connected to the power supply Vss in parallel with the resistor R5.

The drain of the transistor Tr17 is connected to the gate of an N-channel MOS transistor Tr18. The source of the transistor Tr18 is connected to the power supply Vss via a current source 33d, and the drain of the transistor Tr18 is connected to the power supply VDD via a P-channel MOS transistor Tr19. The gate of the transistor Tr19 is connected to the gate of a P-channel MOS transistor Tr20.

The transistor Tr20 has its source connected to the power supply VDD and its drain connected to its own gate as well as to the drain of an N-channel MOS transistor Tr21. The gate of the transistor Tr21 is supplied with a constant voltage Vcst, and the source of the transistor Tr21 is connected to the power supply Vss via the current source 33d. The constant voltage Vcst is generated by a constant-voltage generation circuit, not shown.

The transistors Tr18 to Tr21 form a differential circuit. When the gate potential of the transistor Tr18 rises, the drain potential of the transistor Tr18 falls and, at the same time, the drain potential of the transistor Tr21 rises. On the other hand, when the gate potential of the transistor Tr18 falls, the drain potential of the transistor Tr18 rises and, at the same time, the drain potential of the transistor Tr21 falls.

The drains of the transistors Tr18, Tr19 are connected to the gate of a P-channel MOS transistor Tr22. The source of the transistor Tr22 is connected to the power supply VDD, while the drain of the transistor Tr22 is connected to the power supply Vss via a resistor R6. The control signal CNTL is output from the drain of the transistor Tr22.

In the comparator 32, when the peak voltages of the amplified wobble signal SG2 and its complementary signal /SG2 exceed the reference voltage Vref, the potential of the node N1 falls, and the drain current of the transistor Tr17 is increased. With this increase in the drain current of the transistor Tr17, the gate potential of the transistor Tr18 rises to increase the drain current of the transistor Tr18, and the gate potential of the transistor Tr22 falls. As a result, the drain current of the transistor Tr22 is increased to raise the voltage of the control signal CNTL.

On the other hand, when the peak voltages of the signals SG2, /SG2 are below the reference voltage Vref, the potential of the node N1 rises, and the drain current of the transistor Tr17 is decreased. With this decrease in the drain current of the transistor Tr17, the gate potential of the transistor Tr18 falls to reduce the drain current of the transistor Tr18, and the gate potential of the transistor Tr22 rises. As a result, the drain current of the transistor Tr22 is decreased to lower the voltage of the control signal CNTL. The capacitor C1 prevents a drastic change in the gate voltage of the transistor Tr18.

Next, the operation of the VGA 21 will be described.

When the amplified wobble signal SG2 has an amplitude of Vin1 as shown in FIG. 13A, and the peak voltage of the amplitude becomes equal to the reference voltage Vref, a control signal CNTL having a voltage Vc1 is output from the comparator 32 as shown in FIG. 14. The constant of each transistor of the GCA 31 and the constant voltage Vcst of the comparator 32 are set such that the amplification factor of the GCA 31 becomes equal to "1" according to the voltage Vc1 of the control signal CNTL.

When the amplitude of the amplified wobble signal SG2 becomes equal to Vin2 as shown in FIG. 13B, and the peak voltage of the amplitude is below the reference voltage Vref, a control signal CNTL having a voltage Vc2 which is lower than Vc1 is output from the comparator 32 as shown in FIG. 14. In this case, the amplification factor of the GCA 31 is set to a value larger than "1" to increase the amplitude of the amplified wobble signal SG2.

When the amplitude of the amplified wobble signal SG2 becomes equal to Vin3 as shown in FIG. 13C, and the peak voltage of the amplitude exceeds the reference voltage Vref, a control signal CNTL having a voltage Vc3, which is higher than Vc1, is output from the comparator 32 as shown in FIG. 14. In this case, the amplification factor of the GCA 31 is set to a value smaller than "1" to reduce the amplitude of the amplified wobble signal SG2.

Therefore, even if the amplitude of the wobble signal SG1 from the pickup device 11 has changed, the amplified wobble signal SG2, the peak voltage of which is substantially identical to the reference voltage Vref, is generated by the VGA 21.

Figure 15:
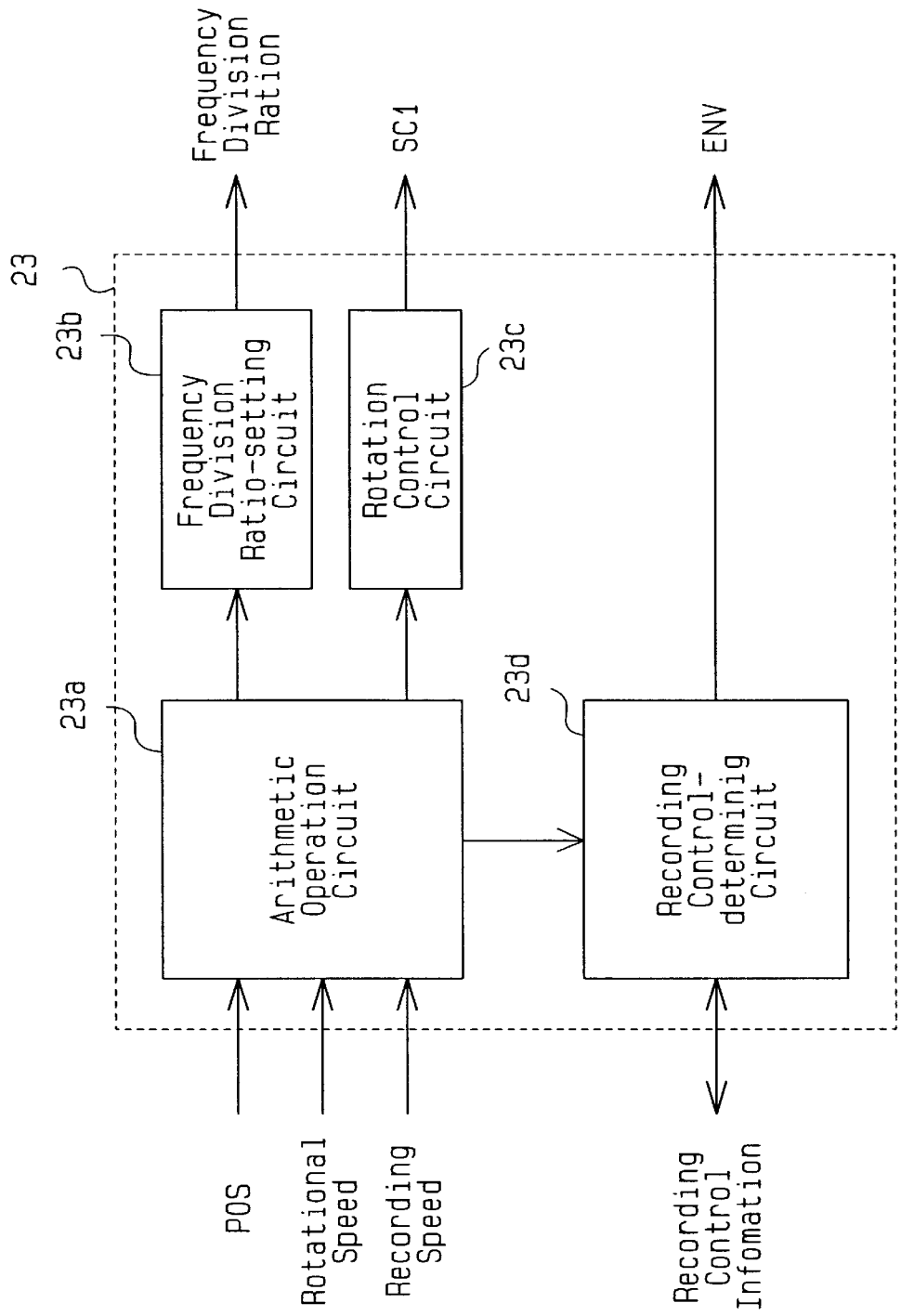
FIG. 15 is a schematic block diagram of a recording control circuit of the data recording apparatus of FIG. 7.

FIG. 15 schematically shows the construction of the recording control circuit 23. The recording control circuit 23 includes an arithmetic operation circuit 23a, a frequency division ratio-setting circuit 23b, a rotation control circuit 23c, and a recording control-determining circuit 23d.

The arithmetic operation circuit 23a receives the rotational speed information (rotation number information) of the disk D from the wobble circuit 22, the position information from the pickup device 11, and the preset value (recording speed information) from the microcomputer 14, and performs predetermined arithmetic operations using the received pieces of information. Then, the circuit 23a supplies a result of the operations to the frequency division ratio-setting circuit 23b and the rotation control circuit 23c.

The frequency division ratio-setting circuit 23b determines proper frequency division ratios (M, N), based on the result of the arithmetic operations of the arithmetic operation circuit 23a, and supplies the frequency division ratio-setting signal to the reference clock generator circuit 25.

The rotation control circuit 23c generates the rotation control signal SC1 from the result of the arithmetic operations of the arithmetic operation circuit 23a, to properly maintain the rotational speed (number of rotations per unit time) of the spindle motor 12. The spindle motor 12 increases, reduces, or maintains its rotational speed in response to the rotation control signal SC1.

The recording control circuit 23d determines execution or stoppage of recording operation based on the recording control information from the microcomputer 14 and the result of the arithmetic operations of the arithmetic operation circuit 23a and supplies the recording control signal ENV generated based on the result of the determination to the pickup device 11.

Figure 16:
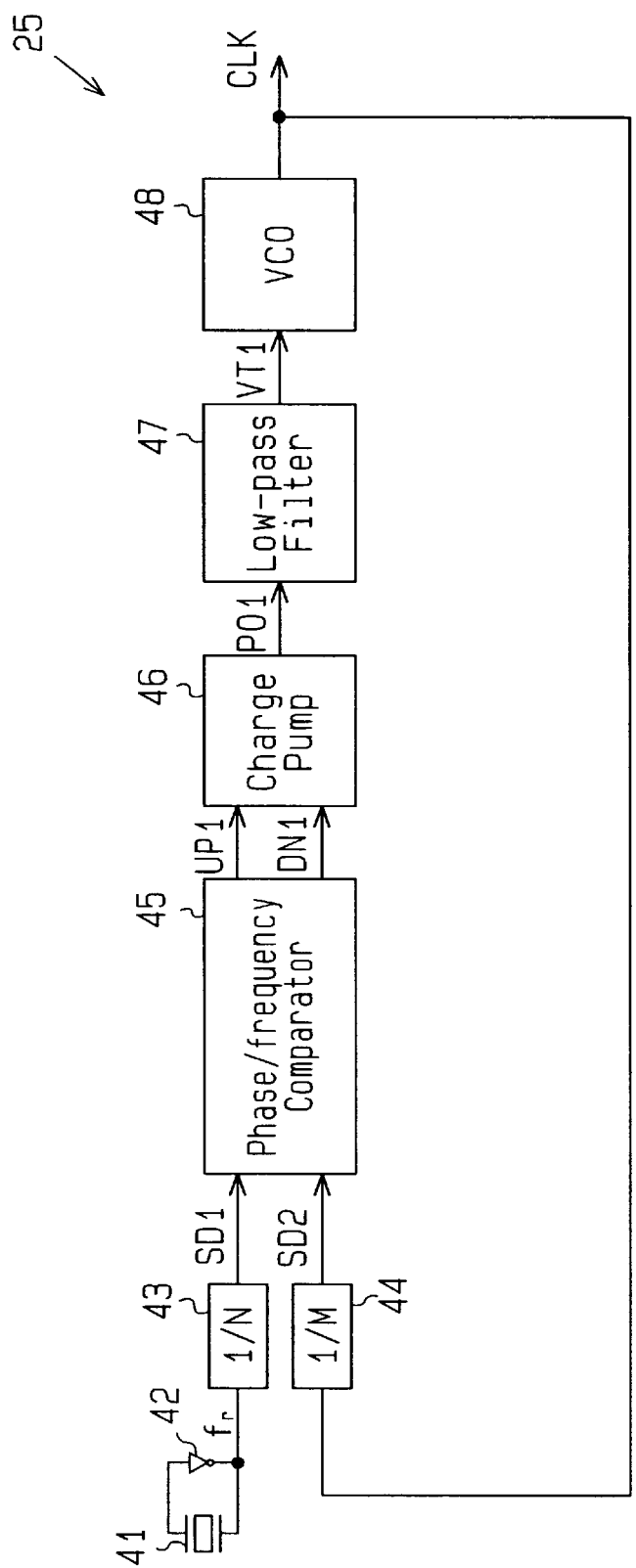
FIG. 16 is a schematic block diagram of a reference clock generator circuit of the data recording apparatus of FIG. 7.

FIG. 16 schematically shows the construction of the reference clock generator circuit 25.

The reference clock generator circuit 25 includes a crystal oscillator (X'tal) 41, an inverter circuit 42, a first frequency divider (first counter) 43, a second frequency divider (second counter) 44, a phase/frequency comparator 45, a charge pump 46, a low-pass filter (LPF) 47, and a voltage controlled oscillator (VCO) 48.

Opposite terminals of the crystal oscillator 41 are connected to respective input and output terminals of the inverter circuit 42, and the crystal oscillator 41 supplies a reference signal fr having a natural oscillation frequency (fx) to the first frequency divider 43.

The first frequency divider 43 divides the reference signal fr by the frequency division ratio N of the frequency division ratio-setting signal supplied from the recording control circuit 23 to generate a first frequency dividing signal SD1. The second frequency divider 44 divides the reference clock signal CLK according to the frequency division ratio M of the frequency division ratio-setting signal to generate a second frequency dividing signal SD2.

The phase/frequency comparator 45 supplies an UP signal UP1 or a DOWN signal DN1 to the charge pump 46 in accordance with the phase difference and the frequency difference between the first and second frequency dividing signals SD1, SD2. The charge pump 46 supplies the LPF 47 with a voltage signal PO1 having a voltage corresponding to a time period over which the UP signal UP1 or the DOWN signal DN1 at an L level is supplied thereto.

The LPF 47 smoothes the voltage signal PO1 supplied from the charge pump 46 and supplies the VCO 48 with a control voltage VT1 from which high frequency components are eliminated. The VCO 48 generates the reference clock signal CLK, which has a frequency corresponding to the control voltage VT1. The reference clock signal CLK is supplied to the data buffer 27 and the EFM modulation circuit 28.

Figure 17:
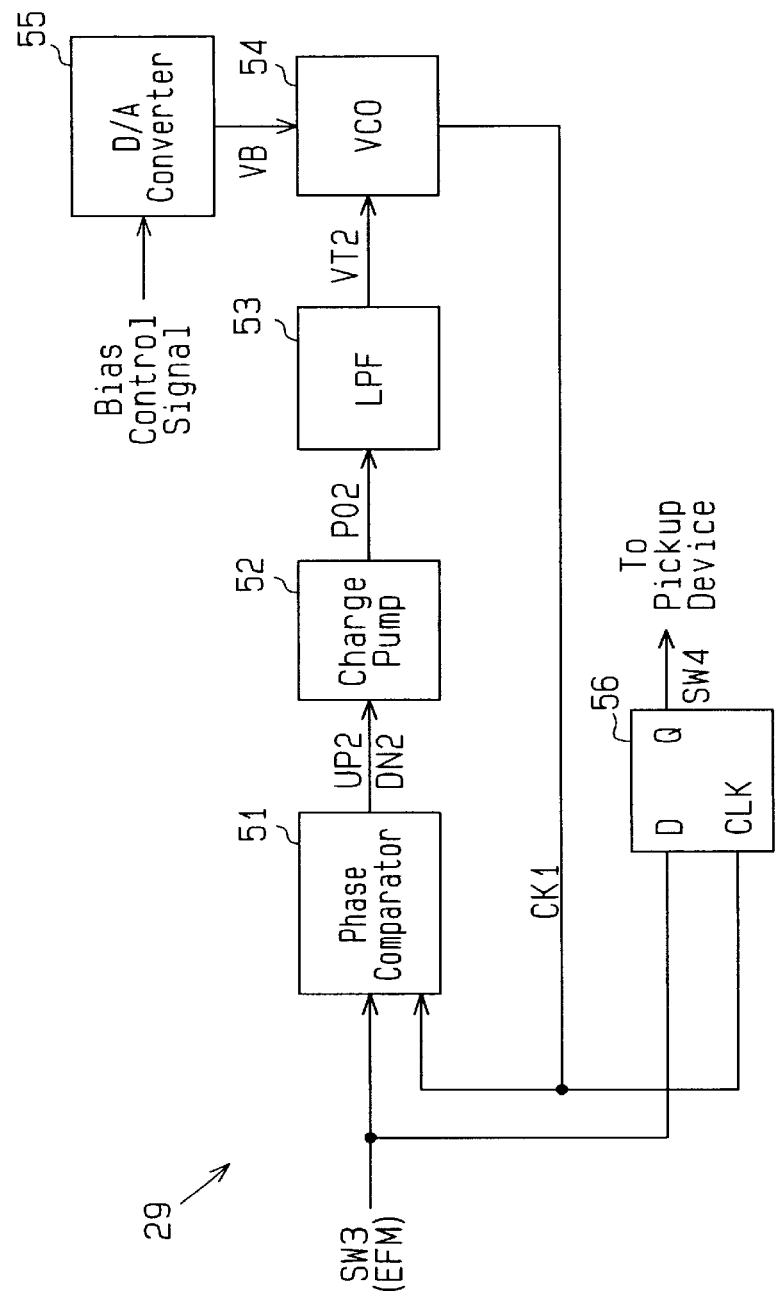
FIG. 17 is a schematic block diagram of a data generation circuit of the data recording apparatus of FIG. 17.

FIG. 17 schematically shows the construction of the data generation circuit 29. The data generation circuit 29 includes a phase comparator 51, a charge pump 52, a low-pass filter (LPF) 53, a voltage control oscillator (VCO) 54, a digital-to-analog converter (D/A converter) 55, and an output circuit 56.

The phase comparator 51 receives the EFM-modulated signal SW3 from the EFM modulation circuit 28 and the internal clock signal CK1 from the VCO 54, and supplies an UP signal UP2 or a DOWN signal DN2 to the charge pump 52 based on the phase difference between the EFM-modulated signal SW3 and the internal clock signal CK1.

The charge pump 52 supplies the LPF 53 with a voltage signal PO2 having a voltage corresponding to a time period during which the UP signal UP2 or the DOWN signal DN2 at an L level is supplied. The LPF 53 smoothes the voltage signal PO2 supplied from the charge pump 52 and supplies the VCO 54 with a control voltage VT2 from which high frequency components are eliminated. The VCO 54 generates the internal clock signal CK1 having a frequency corresponding to the control voltage VT2 and a bias voltage VB.

Figure 20:
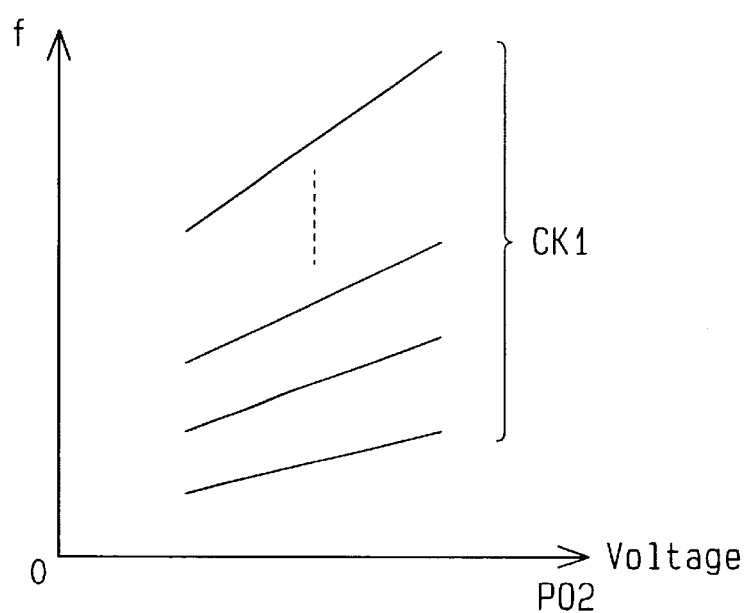
FIG. 20 is a graph showing the relationship between an output voltage of a charge pump of the data generation circuit of FIG. 17 and an oscillation frequency of a VCO.

The bias voltage VB is supplied to the VCO 54 from the D/A converter 55. The D/A converter 55 is provided for setting the central frequency of the VCO 54. The D/A converter 55 receives a bias control signal from the recording control circuit 23 and performs digital-to-analog conversion of the bias control signal to generate the bias voltage VB. The bias control signal is generated by the recording control circuit 23 based on the position information from the pickup device 11. More specifically, when the pickup device 11 moves toward the outer edge of the disk D, the bias voltage VB is progressively increased, and when the pickup device 11 toward the inner edge of the disk D, the bias voltage VB is progressively decreased. Accordingly, the bias voltage VB supplied from the D/A converter 55 is adjusted in a stepwise manner according to the position of the pickup device 11. As a result, as shown in FIG. 20, the VCO 54 changes the frequency of the internal clock signal CK1 based on the voltage signal PO2 from the charge pump 52 according to a change in the bias voltage VB. As the frequency of the internal clock signal CK1 becomes higher, the gain of the VCO 54 is increased, and the slope of the internal clock signal CK1 with respect to the change in the voltage signal PO2 is increased.

The internal clock signal CK1 is not only returned to the phase comparator 51 but is supplied to the output circuit 56. Preferably, the output circuit 56 is formed by a flip-flop circuit. The data input terminal of the flip-flop circuit is supplied with the EFM-modulated signal SW3 from the EFM modulation circuit 28, while the clock input terminal of the flip-flop circuit is supplied with the internal clock signal CK1. Consequently, the output circuit 56 latches the EFM-modulated signal SW3 in response to the internal clock signal CK1 to supply a recording signal SW4 to the pickup device 11. That is, the pickup device 11 is supplied with the recording signal SW4, the frequency of which is identical to that of the EFM-modulated signal SW3.

Figure 18:
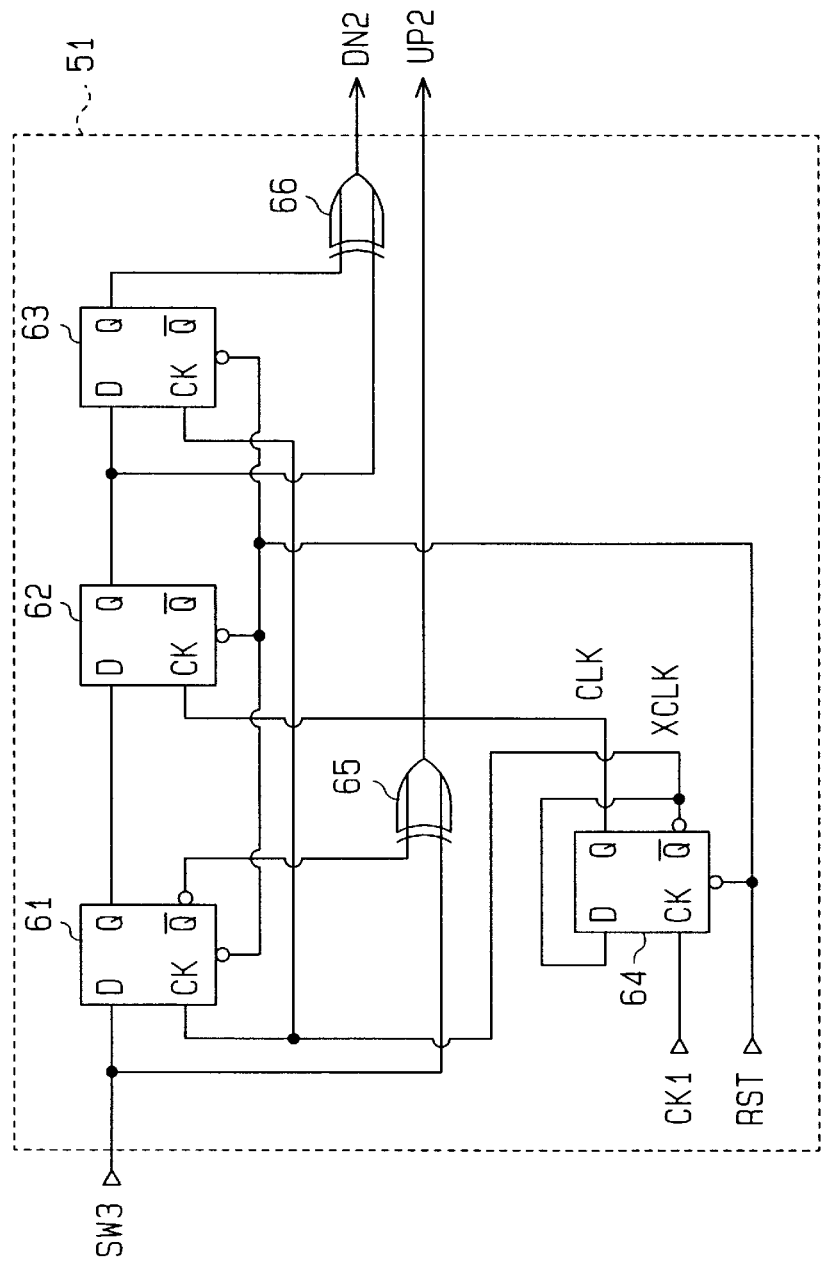
FIG. 18 is a schematic block diagram of a phase comparator of the data recording apparatus of FIG. 17.

FIG. 18 schematically shows a circuit of the phase comparator 51. The phase comparator 51 includes four D-type flip-flops (DFs) 61 to 64, and exclusive-OR (EOR) circuits 65, 66. The EFM-modulated signal SW3 is supplied to a data input terminal D of the first DF 61, which is a first stage of the serially-connected DFs 61 to 63, and to the EOR circuit 65.

On the other hand, the internal clock signal CK1 is supplied to a clock input terminal CK of the fourth DF 64 and divided by 2 by the fourth DF 64 such that the clock signal CLK is generated. The clock signal CLK is inverted to generate an inverted clock signal XCLK. The clock signal CLK is supplied to a clock input terminal CK of the second DF 62, while the inverted clock signal XCLK is supplied to clock input terminals CK, CK of the first and third DFs 61, 63.

The first DF 61 supplies the EFM-modulated signal SW3 via a corresponding output terminal Q to a date input terminal D of the second DF 62 is response to a rise of the inverted clock signal XCLK. The second DF 62 supplies the signal received from the first DF 61, via a corresponding output terminal Q, to a data input terminal D of the third DF 63 and a first input terminal of the EOR circuit 66 in response to a rise of the clock signal CLK. The third DF 63 supplies the signal received from the second DF 62, via a corresponding output terminal Q, to a second input terminal of the EOR circuit 66 in response to a rise of the inverted clock signal XCLK.

The EOR circuit 66 supplies the DOWN signal DN2 to the charge pump 52 in response to the output signals received from the respective output terminals Q of the second and third DFs 62, 63. The EOR circuit 65 receives the EFM-modulated signal SW3 as well as an output signal output from an inverted output terminal /Q of the first FD 61, and supplies the UP signal UP2 to the charge pump 52 in response to the two received signals.

The phase comparator 51 generates the UP signal UP2 and the DOWN signal DN2 as follows:

(1) When the EFM-modulated signal SW3 and the internal clock signal CK1 rise simultaneously, the two signals SW3 and CK1 are in phase with each other. In this case, the phase comparator 51 generates the UP signal UP2 and the DOWN signal DN2 such that they have an identical pulse width.

(2) When the rise of the EFM-modulated signal SW3 lags that of the internal clock signal CK1, the signal CK1 has an advanced phase with respect to the signal SW3. In this case, the phase comparator 51 generates the UP signal UP2 and the DOWN signal DN2 such that the UP signal UP2 has a shorter pulse width than that of the DOWN signal DN2.

(3) When the rise of the EFM-modulated signal SW3 leads that of the internal clock signal CK1, the signal CK1 has a delayed phase with respect to the signal SW3. In this case, the phase comparator 51 generates the UP signal UP2 and the DOWN signal DN2 such that the UP signal UP2 has a longer pulse width than that of the DOWN signal DN2.

As described above, since the data generation circuit 29 includes the phase comparator 51, the frequency of the internal clock signal CK1 is locked to the variable frequency of the EFM-modulated signal SW3.

Figure 19:
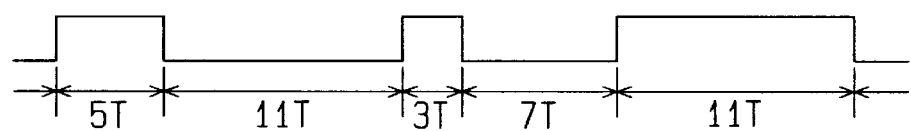
FIG. 19 shows a waveform of an EFM signal.

As shown in FIG. 19, the EFM signal is an irregular one. More specifically, the EFM signal is a combination of signals having respective periods 3T to 11T. In the EFM signal, the length of each high-potential (H level) period and that of each low-potential (L level) period are significant. The lengths of the H level and L level periods are classified into nine kinds (3T to 11T). Therefore, the EFM signal has a waveform formed by combining the nine kinds of periods in a manner such that each H level period and each L level period occur alternately. Thus, the frequency of the EFM signal is not constant.

Moreover, in the case of recording CLV data on a disk D while rotating the disk D at a constant rotational speed, the frequency of the EFM signal varies with the position of the pickup device 11. Therefore, when the EFM signal is used as a reference signal in a PLL circuit having a conventional phase comparator, the PLL circuit is never locked due to the constantly changing frequency of the reference signal. This is because the conventional phase comparator is capable of performing phase comparison between a reference signal and a feedback signal during the fall of the reference signal, but not during the rise of the reference signal.

Next, the operation of the optical disk apparatus 10 will be described.

Now, it is assumed that CLV data is recorded at quadruple (4×) speed on a disk D compliant with the CD-R standard.

Since the CLV disk D is rotated by the CAV method, the linear speed of the disk D (i.e. the linear speed of a recording track) changes with the position of the pickup device 11. More specifically, the linear speed of the innermost track is lowest, and the linear speed of the outermost track is approximately 2.52 times that of the innermost track. Therefore, if the disk D can be rotated such that the linear speed of the innermost track thereof becomes equal to a linear speed during CLV recording, it is possible to obtain a CLV recording speed.

The linear speed (V) at which the disk D is rotated for recording by the CAV method and the rotational speed ($\phi$) of the disk D are determined as follows. Assume that when the frequency division ratios (M, N) of the reference clock generator circuit 25 are each set to "1", a speed equivalent to a data sending speed during CLV data recording can be obtained based on an oscillation frequency (fx) of the crystal oscillator 41.

If the position of the pickup device 11 is represented by (r) or radius, the linear speed (V) of the disk D at the position (r) can be obtained using the following equations:

$$(V) = (x) \times (v) \times (r) \div (r \text{ min})$$

$$(\phi) = (x) \times (v) \div \text{ angular speed}(2\pi \times (r \text{ min}))$$

where (x) represents a recording speed in terms of how many times the rotation of the disk is faster than the standard (single) speed; (v) represents a linear speed in a single-speed (standard-speed:1×) mode; and (r min) represents the radius of the innermost circumference of the disk D.

Further, assuming that the division ratio N of the frequency division ratios (M, N) of the reference clock generator circuit is set to "1", the frequency division ratio M can be obtained using the following equation:

$$M(r) = (x) \times (r) \div (r \text{ min})$$

The data sending speed (f) of the data generation circuit 29 is calculated using the following equation:

$$f(r) = (fx) \times M \div N$$

The frequency (F) of the wobble signal from a track on which data is to be recorded is determined using the following equation:

$F(r) = (V \div v) \times$ a wobble frequency in the single speed of rotation of the disk In general, the linear speed (v) in the single speed of rotation of the disk, the radius (r max) of the outermost circumference of the disk, the radius (r min) of the innermost circumference of the disk, and the wobble frequency in the single speed assume the following values:

$(v) = 1.25$ m/s $(r \text{ max}) = 58$ mm $(r \text{ min}) = 23$ mm wobble frequency=22.05 kHz These values are given to the recording control circuit 23 by the microcomputer 14.

The recording control circuit 23 determines the recording linear speed (V), the rotational speed ($\phi$) of the disk, the frequency division ratios (M, N) of the reference clock generator circuit 25, and the data sending speed (f) of the data generation circuit 29 using the above values.

For instance, assuming that the position (r) of the pickup device 11 on the disk D is equal to 25 mm and N=1 holds, the recording linear speed (V) is calculated as follows:

$$(V) = (x) \times (v) \times (r) \div (r \text{ min})$$
$$= 4 \times 1.25 \times 25 \div 23$$
$$= 5.43 \text{ (m/s)}$$

The rotational speed (φ) of the disk is calculated as follows:

$$(\phi) = (x) \times (v) \times (2\pi \times (r \text{ min}))$$
$$= 4 \times 1.25 \times 60 \text{ (sec.)} \div (2\pi \times 0.023)$$
$$= 2076 \text{ (rpm)}$$

The frequency division ratios (M, N) of the reference clock generator circuit 25 are calculated as follows:

$$M(25) = (x) \times (r) \div (r \text{ min})$$
$$= 4 \times 25 \times 23$$
$$= 4.348$$
$$M : N = 4.348 : 1 \approx 87 : 20$$

Further, assuming that the oscillation frequency (fx) of the crystal oscillator 41 is 16.9344 MHz, the data sending speed (f) of the data generation circuit 29 can be calculated as follows:

$$f(25) = (fx) \times (M) \div N$$
$$= 16.9344 \times 87 \div 20$$
$$= 73.66 \text{ MHz}$$

The wobble frequency (F) read out from the disk D is calculated as follows:

$$F(r) = (V \div v) \times \text{the wobble frequency in the single speed}$$
$$= 5.43 \div 1.25 \times 22.05$$
$$= 95.87 \text{ kHz}$$

Thus, in the recording control circuit 23, the frequency division ratio M of the M counter 44 of the reference clock generator circuit 25 is set to "87", and the frequency division ratio N of the N counter 43 is set to "20", to cause the reference clock generator circuit 25 to supply the data generation circuit 29 with a reference clock signal CLK having a frequency of 73.66 MHz.

Further, the recording control circuit 23 controls the spindle motor 12 such that the disk D is rotated at a rotational speed of 2076 rpm and monitors, based on the rotational speed information from the wobble circuit 22, whether or not the wobble frequency is held at 95.87 kHz.

The amplitude of a signal indicative of the rotational speed information received from the wobble circuit 22 varies with the position of the pickup device 11 and the rotational speed of the disk D. Therefore, the amplitude of the signal is held constant by the VGA 21 prior to the supply of the rotational speed information to the recording control circuit 23.

The recording control circuit 23 supplies the pickup device 11 with the recording control signal ENV for stopping the recording operation of the pickup device 11 so as to inhibit the device 11 from performing data recording before the recording apparatus is ready for recording.

The recording data is supplied to the data buffer 27 via the data interface 26. The data buffer 27 stores the recording data temporarily and then supplies the recording data to the EFM modulation circuit 28 in response to the reference clock signal CLK.

The EFM modulation circuit 28 converts the 8-bit data supplied from the data buffer 27 to the 17-bit EFM-modulated data and then supplies the EFM-modulated data to the data generation circuit 29.

Thereafter, when focusing and tracking servo are completed, and the recording apparatus is ready for data recording, the pickup device 11 is activated by the recording control signal ENV supplied from the recording control circuit 23, and the data is recorded on the disk D.

Since the pickup position (r) is shifted toward the outer edge of the disk D as the data recording proceeds, the recording control circuit 23 resets the frequency division ratios (M, N) of the reference clock generator circuit 25 and the data sending speed (f) of the data generation circuit 29, based on the head position information from the pickup device 11 and the rotational speed information from the wobble circuit 22.

The rotational speed (φ) of the disk does not change during one recording operation. Further, the linear speed (V) of a recording track and the wobble frequency (F) are not altered.

For instance, assuming that the position (r) of the pickup device 11 has changed from 25 mm to 25.3 mm, the frequency division ratios (M, N) of the reference clock generator circuit 25 are determined as follows:

$$M(26) = (x) \times (r) \div (r \text{ min})$$
$$= 4 \times 25.3 \div 23$$
$$= 4.400$$
$$M : N = 4.400 : 1 \approx 88 : 20$$

Further, the data sending speed (f) of the data generation circuit 29 is calculated as follows:

$$f(26) = (fx) \times (M) \div N$$
$$= 16.9344 \times 88 \div 20$$
$$= 74.51 \text{ MHz}$$

Therefore, the recording control circuit 23 changes the frequency division ratio M of the M counter 44 of the reference clock generator circuit 25 from 87 to 88 such that the reference clock generator circuit 25 and the data generation circuit 29 operate based on the frequency of 74.51 MHz.

Thus, the CLV-formatted data is recorded on the disk D with the rotational speed of the spindle motor being held constant.

When the data supply is interrupted or when the recording apparatus is not ready for recording, the recording control circuit 23 supplies the pickup device 11 with the recording control signal ENV for inhibiting the device 11 from performing data recording until the recording apparatus becomes ready for recording.

The data recording apparatus 13 according to the above embodiment has the following advantages:

(1) The data recording apparatus 13 causes the spindle motor 12 to rotate the disk D in a manner compliant with the CAV method and at the same time control the output rate of the recording signal SW4 to be supplied to the pickup device 11, based on the position information of the pickup device 11, so as to record CLV data on the disk D. As a result, the CLV data can be accurately recorded using the spindle motor 12, which has a low torque, thereby permitting other systems to properly read the data recorded on the recording medium in a manner compliant with the CLV method as described above.

(2) The VGA 21 amplifies the wobble signal SG1 read from the disk D using the pickup device 11 to generate the amplified wobble signal SG2 having a constant amplitude. This enables the wobble circuit 22 to easily detect the frequency of the wobble signal based on the amplified wobble signal SG2.

It should be apparent to those skilled in the art that the present invention may be embodied in many other specific forms without departing from the spirit or scope of the invention. Particularly, it should be understood that the present invention may be embodied in the following forms.

Figure 21:
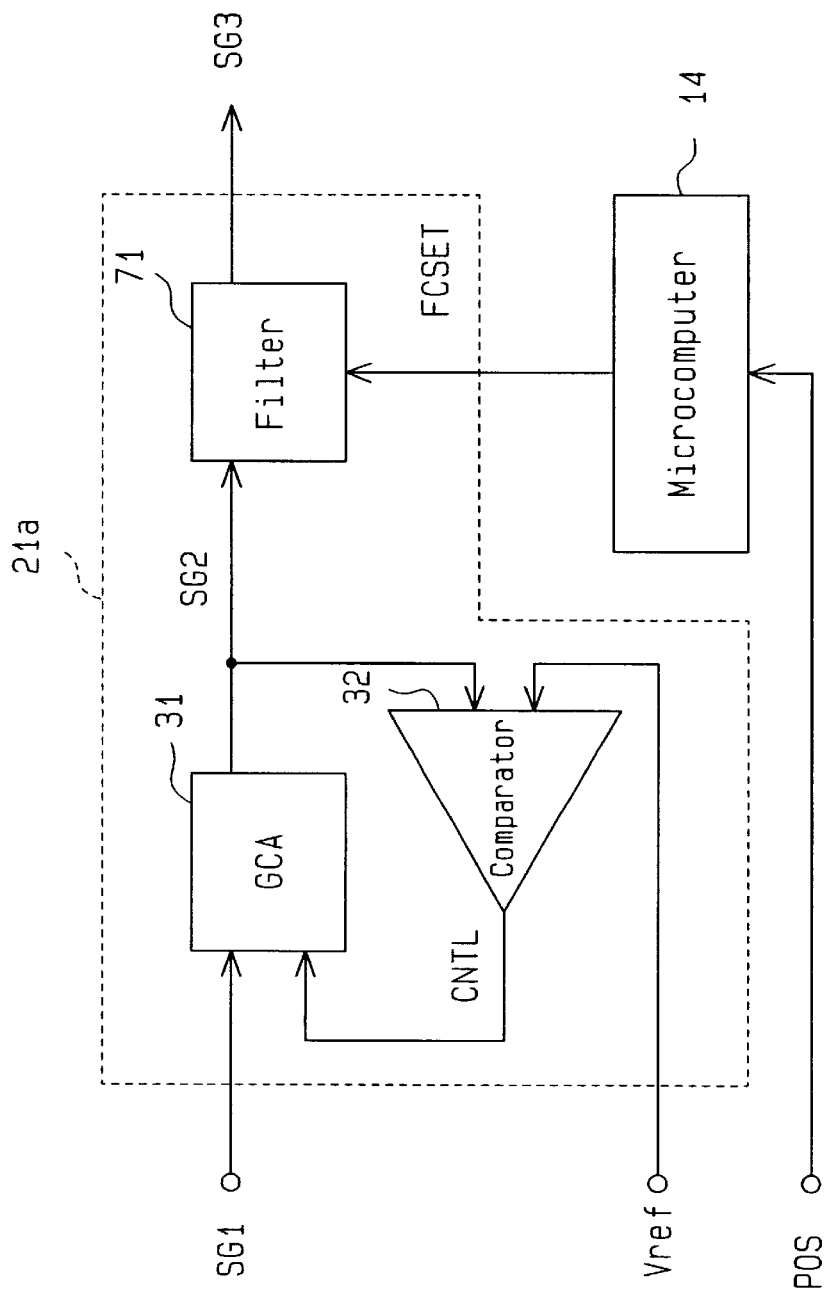
FIG. 21 is a schematic block diagram of a variation of the variable gain amplifier of FIG. 10.

(a) The construction of the VGA 21 may be modified as desired. FIG. 21 schematically shows a variation 21a of the VGA 21. The VGA 21a is comprised of a gain control amplifier (GCA) 31, a comparator 32, and a filter 71. The GCA 31 amplifies the wobble signal SG1 from the pickup device 11 to generate an amplified wobble signal SG2.

The comparator 32 compares between the amplified wobble signal SG2 and the reference voltage signal Vref and supplies the control signal CNTL based on the result of the comparison to the GCA 31. The GCA 31 generates the amplified wobble signal SG2 having a constant amplitude, by changing its own amplification factor in response to the control signal CNTL.

The microcomputer 14 receives the position information POS from the pickup device 11 and supplies a control signal FCSET to the filter 71 based on the position information. The filter 71 adjusts a cutoff frequency by changing constants, such as capacitance and the like, in response to the control signal. This control changes the cutoff frequency such that it follows a change in the frequency of the amplified wobble signal SG2. The filter 71 extracts a desired frequency component from the amplified wobble signal SG2 to generate a filtered wobble signal SG3. Thus, the adjustment of the cutoff frequency of the filter 71 in response to the control signal FCSET makes it possible to extract a signal having a desired frequency even if the frequency of the amplified wobble signal SG2 (i.e. the wobble signal SG1) changes. In other words, undesired frequency components contained in the amplified wobble signal SG2 can be reliably eliminated. As a result, the rotational speed of the disk D in the recording control circuit 23 can be detected easily and reliably.

The filter 71 may have a plurality of different cutoff frequencies. In this case, one of the cutoff frequencies is selected by the control signal FCSET. Further, the filter 71 may be connected between the VGA 21a and the wobble circuit 22.

Figure 22:
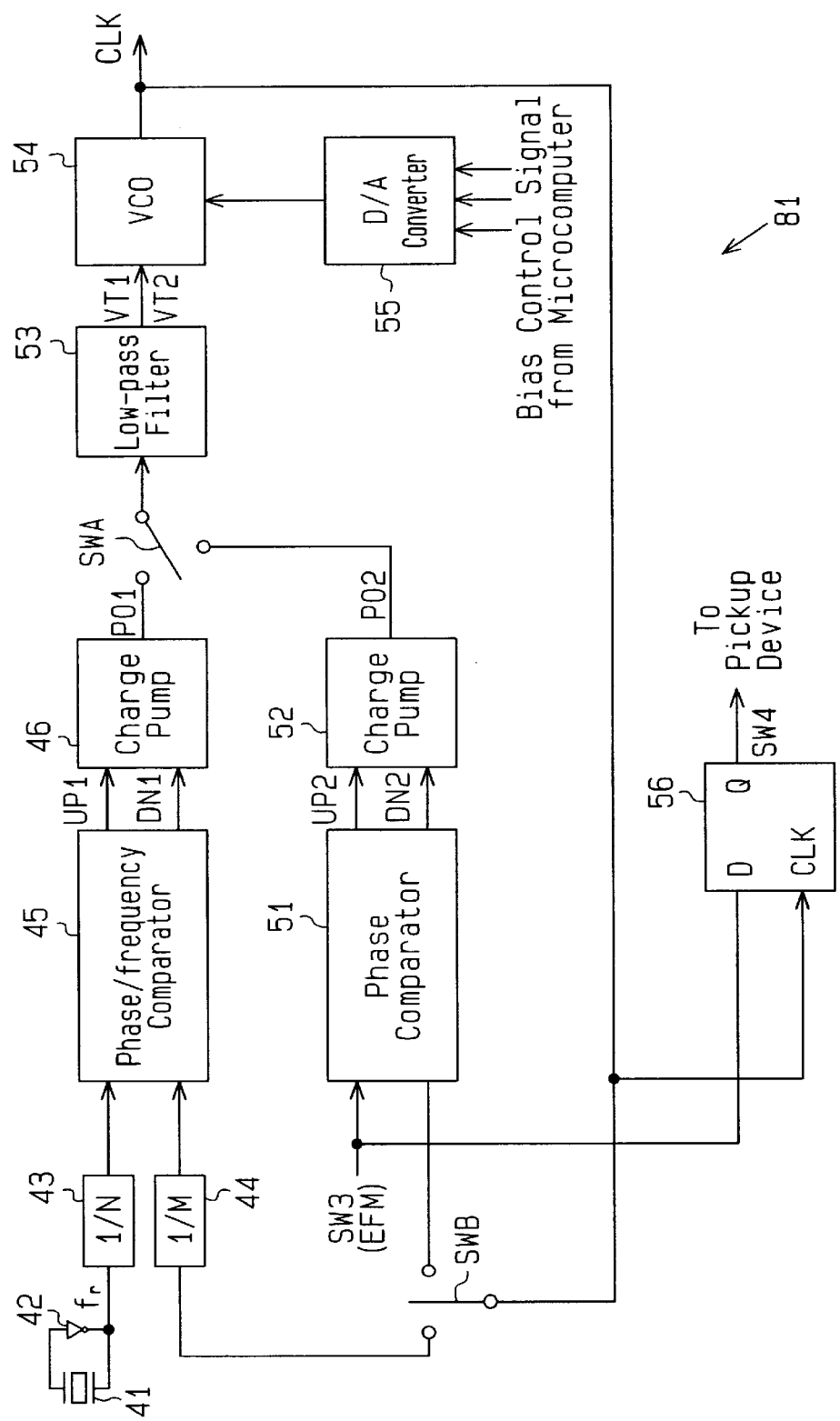
FIG. 22 is a schematic block diagram of a signal generation circuit of the present invention.

(b) As shown in FIG. 22, the reference clock generator circuit 25 and the data generation circuit 29 may be combined to form a signal generation circuit 81. The signal generation circuit 81 includes a crystal oscillator 41, an inverter circuit 42, first and second frequency dividers 43, 44, a phase/frequency comparator 45, a charge pump 46, a phase comparator 51, a charge pump 52, a low-pass filter 53, a VCO 54, a D/A converter 55, and an output circuit 56.

Further, the signal generation circuit 81 includes switches SWA, SWB controlled by the microcomputer 14. Control of the switches may be performed by the recording control circuit 23.

The first switch SWA is provided to selectively supply one of an output signal PO1 from the first charge pump 46 and an output signal PO2 from the second charge pump 52 to the low-pass filter 53. The second switch SWB is provided to supply a reference clock signal CLK from the VCO 54 selectively to one of the second frequency divider 44 and the second comparator 51.

First, the microcomputer 14 switches between the first and second switches SWA and SWB to cause the signal generation circuit 81 to operate as a reference clock generator circuit. The signal generation circuit 81 sets the division ratios M, N of the respective first and second frequency dividers 43, 44, based on the wobble signal SG1 read from the disk D and the position information POS from the pickup device 11, and locks the frequency of the reference clock signal CLK to a frequency corresponding to the position of the pickup device 11. Then, the microcomputer 14 switches between the first and second switches SWA and SWB to cause the signal generation circuit 81 to operate as a data generator. The signal generation circuit 81 changes the phase of the reference clock signal CLK using the EFM-modulated signal SW3 as a reference signal, and supplies a recording signal SW4 to the pickup device 11 according to the modified clock signal CLK.

Since the signal generation circuit 81 makes the shared use of the low-pass filter and the VCO for reference clock generation and data (recording signal) generation, the circuit area of the data recording apparatus can be reduced.

Therefore, the present examples and embodiments are to be considered as illustrative and not restrictive and the invention is not to be limited to the details given herein, but may be modified within the scope and equivalence of the appended claims.

What is claimed is:

1. A data recording apparatus for recording write data on a recording medium, the apparatus comprising:
   a recording control circuit that controls a rotation of the recording medium such that the recording medium is rotated with a constant angular velocity (CAV) method, controls an output rate of the write data based on position information indicating a position of the recording medium where the write data is recorded such that the write data is recorded on the recording medium with a constant linear velocity (CLV) method, and generates a control signal;
   a reference clock generation circuit that generates a reference clock signal based on the control signal;
   a modulation circuit that modulates data in accordance with the reference clock signal; and
   a data generation circuit that generates the write data based on the modulated data.

2. The data recording apparatus according to claim 1, wherein a wobble signal, which has a predetermined frequency, is read from the recording medium, and wherein the recording control circuit controls the output rate of the data based on the position information and the predetermined frequency of the wobble signal.

3. The data recording apparatus according to claim 2, further comprising a variable gain amplifier that receives the wobble signal from the pickup device and generates an amplified wobble signal having a constant amplitude.

4. The data recording apparatus according to claim 3, further comprising a wobble circuit, connected to the variable gain amplifier, that receives the amplified wobble signal from the variable gain amplifier and detects a rotational speed of the recording medium based on the amplified wobble signal, and wherein the recording control circuit controls the output rate of the write data based on the detected rotational speed.

5. The data recording apparatus according to claim 4, further comprising a filter that filters the amplified wobble signal and generates a filtered wobble signal while adjusting a cutoff frequency thereof in accordance with the position information.

6. The data recording apparatus according to claim 2, wherein the reference clock generator circuit divides an oscillation signal by a predetermined frequency division ratio to generate the reference clock signal, wherein the recording control circuit controls an output rate of the write data by setting the predetermined frequency division ratio of the reference clock generator circuit in accordance with the position information and the predetermined frequency of the wobble signal, the apparatus further comprising a data buffer, which is connected to the reference clock generator circuit, that outputs the data to be recorded in accordance with the reference clock signal.

7. The data recording apparatus according to claim 6, wherein the reference clock generator circuit includes a voltage-controlled oscillator that generates the reference clock signal while adjusting the frequency of the reference clock signal in a step like manner in accordance with a bias control signal set according to the position information.

8. The data recording apparatus according to claim 6, wherein the data generation circuit includes a PLL that generates an internal clock signal having a phase substantially coincident with that of the modulated data, and an output circuit, which is connected to the PLL, that receives the modulated data and outputs the write data in accordance with the internal clock signal.

9. A data recording apparatus for recording write data on a recording medium, the apparatus comprising:

a recording control circuit that controls a rotation of the recording medium such that the recording medium is rotated with a constant angular velocity (CAV) method, controls an output rate of the write data based on position information indicating a position of the recording medium where the write data is recorded such that the write data is recorded on the recording medium with one of a constant linear velocity (CLV) method and a zone constant linear velocity (ZCLV) method, and generates a control signal;

a reference clock generation circuit that generates a reference clock signal based on the control signal;

a modulation circuit that modulates data in accordance with the reference clock signal; and a data generation circuit that generates the write data based on the modulated data.

10. A data recording apparatus for recording write data on a recording medium, wherein a wobble signal having a predetermined frequency is read from the recording medium, the apparatus comprising:

a variable gain amplifier that receives the wobble signal and generates an amplified wobble signal having a constant amplitude; and a recording control circuit that controls a rotation of the recording medium such that the recording medium is rotated with a constant angular velocity (CAV) method controls an output rate of the write data based on position information, which indicates a position of the recording medium where the write data is recorded, and the predetermined frequency of the amplified wobble signal such that the write data is recorded on the recording medium with one of a constant linear velocity (CLV) method and a zone constant linear velocity (ZCLV) method, and generates a control signal;

a reference clock generation circuit that generates a reference clock signal based on the control signal;

a modulation circuit that modulates data in accordance with the reference clock signal; and a data generation circuit that generates the write data based on the modulated data.

11. The data recording apparatus according to claim 10, wherein the reference clock generator circuit divides an oscillation signal by a predetermined frequency division ratio and generates the reference clock signal, wherein the recording control circuit controls an output rate of the write data by setting the predetermined frequency division ratio of the reference clock generator circuit based on the position information and the predetermined frequency of the wobble signal, and the apparatus further comprising a data buffer, which is connected to the reference clock generator circuit, that outputs the data to be recorded in accordance with the reference clock signal.

12. A disk apparatus comprising:

a motor that rotates a recording medium;

a pickup device that records data on the recording medium, wherein the pickup device generates position information indicating the position of the pickup device with respect to the recording medium; and a data recording device, which is connected to the motor and the pickup device, that controls the motor such that the recording medium is rotated with a constant angular velocity (CAV) method, controls an output rate of the write data supplied to the pickup device based on the position information such that the write data is recorded on the recording medium with a constant linear velocity (CLV) method, and generates a control signal;

a reference clock generation circuit that generates a reference clock signal based on the control signal;

a modulation circuit that modulates data in accordance with the reference clock signal; and a data generation circuit that generates the write data based on the modulated data.

13. A disk apparatus comprising:

a motor that rotates a recording medium;

a pickup device that records write data on the recording medium, wherein the pickup device generates position information indicating the position of the pickup device with respect to the recording medium; and a data recording device, which is connected to the motor and the pickup device, that controls the motor such that the recording medium is rotated with a constant angular velocity (CAV) method, controls an output rate of the write data supplied to the pickup device based on the position information such that the write data is recorded on the recording medium with one of a constant linear velocity (CLV) method and a zone constant linear velocity (ZCLV) method, and generates a control signal;

a reference clock generation circuit that generates a reference clock signal based on the control signal;

a modulation circuit that modulates data in accordance with the reference clock signal; and a data generation circuit that generates the write data based on the modulated data.

14. A method of recording write data on a recording medium, the method comprising:
- generating position information indicating a position of the recording medium where the write data is recorded;
- rotating the recording medium with a constant angular velocity (CAV) method;
- controlling an output rate of the write data based on the position information such that the write data is recorded on the recording medium with a constant linear velocity (CLV) method;
- generating a reference clock signal based on the position information;
- modulating data in accordance with the reference clock signal; and
- generating the write data based on the modulated data.

15. The method according to claim 14, further comprising:
- reading a wobble signal, which has a predetermined frequency, from the recording medium; and
- controlling the output rate of the data based on the position information and the predetermined frequency of the wobble signal in the step of controlling the output rate.

16. The method according to claim 15, further comprising amplifying the wobble signal to generate an amplified wobble signal having a constant amplitude.

17. The method according to claim 16, further comprising:
- detecting a rotational speed of the recording medium based on the amplified wobble signal; and
- controlling the output rate of the write data based on the position information and the rotational speed in the step of controlling the output rate.

18. The method according to claim 17, further comprising filtering the amplified wobble signal to generate a filtered wobble signal while adjusting a cutoff frequency in accordance with the position information.

19. The method according to claim 15, wherein said generating a reference clock signal includes dividing an oscillation signal by a predetermined frequency division ratio to generate the reference clock signal; and
- wherein said controlling an output rate of the write data includes controlling an output rate of the write data by setting the predetermined frequency division ratio based on the position information and the predetermined frequency of the wobble signal.

20. The method according to claim 19, further comprising adjusting a frequency of the reference clock signal in a step like manner in accordance with the position information.

21. The method according to claim 19, further comprising:
- generating an internal clock signal having a phase substantially coincident with a phase of the modulated data,
- wherein said generating the write data includes generating the write data using the modulated data in accordance with the internal clock signal.

22. A method of recording write data on a recording medium, the method comprising:
- generating position information, wherein the position information indicates a position of the recording medium where the write data is recorded;
- rotating the recording medium with a constant angular velocity (CAV) method;
- controlling an output rate of the write data based on the position information such that the write data is recorded on the recording medium with one of a constant linear velocity (CLV) method and a zone constant linear velocity (ZCLV) method;
- generating a reference clock signal based on the position information;
- modulating data in accordance with the reference clock signal; and
- generating the write data based on the modulated data.

23. The data recording apparatus according to claim 1, wherein the control signal includes a frequency division ration, and wherein the reference clock generation circuit generates the reference clock signal based on the frequency division ration.

24. The data recording apparatus according to claim 1, further comprising a data buffer that outputs the data to the modulation circuit in accordance with the reference clock signal.

25. The data recording apparatus according to claim 1, wherein the data generation circuit generates an internal clock signal based on the modulated data and outputs the writing data in accordance with the internal clock signal.

26. The data recording apparatus according to claim 25, wherein the data generation circuit includes a phase comparator that compares the modulated data and the internal clock signal and locks the frequency of the internal clock signal to the frequency of the modulated data.

* * * * *

UNITED STATES PATENT AND TRADEMARK OFFICE
CERTIFICATE OF CORRECTION

PATENT NO.    : 6,791,918 B1
DATED         : September 14, 2004
INVENTOR(S)   : Hideaki Tanishima It is certified that error appears in the above-identified patent and that said Letters Patent is hereby corrected as shown below:

Column 22,
Lines 31 and 33, change "ration" to -- ratio --.

Signed and Sealed this

Tenth Day of May, 2005

JON W. DUDAS
*Director of the United States Patent and Trademark Office*